US010037840B2

(12) United States Patent
Daibo et al.

(10) Patent No.: US 10,037,840 B2
(45) Date of Patent: Jul. 31, 2018

(54) VECTOR POTENTIAL GENERATION DEVICE, VECTOR POTENTIAL TRANSFORMER, SHIELD PERMEATION DEVICE, NON-CONTACT SPACE ELECTRIC FIELD GENERATION DEVICE, NULL CIRCUIT, AND STRUCTURE FOR VECTOR POTENTIAL GENERATION DEVICE

(71) Applicant: Sumida Power Technology Co., Ltd., Ueda-shi, Nagano (JP)

(72) Inventors: Masahiro Daibo, Morioka (JP); Shuzo Oshima, Morioka (JP)

(73) Assignee: Sumida Power Technology Co., Ltd. (JP)

( * ) Notice: Subject to any disclaimer, the term of this patent is extended or adjusted under 35 U.S.C. 154(b) by 224 days.

(21) Appl. No.: 15/190,264

(22) Filed: Jun. 23, 2016

(65) Prior Publication Data

US 2016/0300652 A1 Oct. 13, 2016

Related U.S. Application Data

(63) Continuation of application No. PCT/JP2014/084594, filed on Dec. 26, 2014.

(30) Foreign Application Priority Data

Dec. 27, 2013 (JP) ................................ 2013-273557

(51) Int. Cl.

*H02J 50/00* (2016.01)
*H01F 5/00* (2006.01)
*H01F 5/02* (2006.01)
*H01F 27/28* (2006.01)

(52) U.S. Cl.

CPC ................ *H01F 5/00* (2013.01); *H01F 5/02* (2013.01); *H01F 27/2823* (2013.01)

(58) Field of Classification Search

CPC .......... H01F 5/00; H01F 5/02; H01F 27/2823
See application file for complete search history.

(56) References Cited

FOREIGN PATENT DOCUMENTS

| | | | |
|---|---|---|---|
| JP | 11-347135 A | | 12/1999 |
| JP | 11347135 A | * | 12/1999 |

OTHER PUBLICATIONS

International Search Report for PCT/JP2014/084594, dated Mar. 31, 2015; ISA/JP (2 pages).

* cited by examiner

*Primary Examiner* — Daniel Cavallari
(74) *Attorney, Agent, or Firm* — Harness, Dickey & Pierce, P.L.C.

(57) ABSTRACT

A vector potential generation device includes a vector potential coil formed by a solenoid coil formed by a wound conductor and a power supply electrically connected between two terminals of the vector potential coil. The vector potential coil is wound circularly around a base body, of which at least a part contacting the solenoid coil has an insulating property. The vector potential generation device is configured to pass a current through the vector potential coil to place the inside of the internal space formed by the winding structure of the vector potential coil in substantially a non-magnetic field state and to generate a vector potential in the internal space.

20 Claims, 26 Drawing Sheets

VECTOR POTENTIAL GENERATION DEVICE, VECTOR POTENTIAL TRANSFORMER, SHIELD PERMEATION DEVICE, NON-CONTACT SPACE ELECTRIC FIELD GENERATION DEVICE, NULL CIRCUIT, AND STRUCTURE FOR VECTOR POTENTIAL GENERATION DEVICE

This application is a continuation patent application of International Application No. PCT/JP2014/084594, filed on Dec. 26, 2014, which claims priority to Japanese Patent Application No. 2013-273557, filed on Dec. 27, 2013. Both applications are hereby expressly incorporated by reference herein in their entireties.

TECHNICAL FIELD

An aspect of the present invention relates to a vector potential generation device, a vector potential transformer, a shield permeation device, a non-contact space electric field generation device, a null circuit, and a structure for a vector potential generation device capable of generating a vector potential field without generating a magnetic field.

BACKGROUND ART

A vector potential is not a scalar quantity such as an electricpotential, but rather a potential that has direction and is a concept that integrates electric fields and magnetic fields.

However, when a vector potential actually appears, because it is accompanied by an electric field or a magnetic electric field, there has been discussion in the past that a vector potential is not a physical quantity, but rather a product of the mathematics. The issue was ultimately resolved by the late Dr. Tomura of Hitachi Ltd., who elegantly demonstrated the theoretical prediction known as the Aharonov-Bohm Effect by an electron beam interference experiment. The results of the experiment verified that a vector potential changes the phase of an electron wave. If, rather than controlling an electric field or a magnetic field, a vector potential can be controlled, new possibilities are opened up for electromagnetic applications.

Conventionally, in order to generate a vector potential, a device has been constituted with a wire wound in the form of a coil, and the magnetic field has had a relatively simple path. For this reason, the vector potential had been placed so that it rotated about the magnetic lines as a center. If electric manipulation was attempted, a magnetic field always appeared (refer to, for example Japanese Patent Application Publication No. 1999-347135).

Also, conventionally, in order to generate an electric field in space, electrodes are brought into mutual opposition, and an electric field between electrodes of a so-called capacitor has been used. In this case, because metal electrodes are directly exposed to the outside, there have been cases in which corrosion and discharge occurred due to the surrounding atmosphere. Because of the capacitor structure, the load impedance becomes capacitive, the impedance increases, and impedance matching becomes difficult. In addition, because the electrodes are exposed, there has been a danger of electrical shock by high voltage.

Next, in a case in which a conductive medium is placed inside an electric field when conventionally time varying magnetic field has been applied to a conductor, an eddy current is generated in a circle. Since induced-current always flows as eddy-current in conductive medium when a magnetic field is applied, it is difficult to apply an electric current linearly in the specific point.

Additionally, in a conventional transformer using a conductive wire as the electrically conductive medium, because a magnetic field leaks from the primary coil, there had been cases in which other apparatuses were adversely affected. In particular, with electron beam apparatuses that draw microfine patterns, and medical apparatuses that cannot be allowed to malfunction and moving transport equipment, strict magnetic shielding has become necessary.

SUMMARY OF INVENTION

Technical Problem

One aspect of the present invention provides a vector potential generation device that can generate a vector potential field without generating a magnetic field.

One aspect of the present invention provides a vector potential transformer that transfers energy or a signal without generating a magnetic field.

One aspect of the present invention provides a shield permeation device that transfers energy or a signal without generating a magnetic field.

One aspect of the present invention provides a non-contact space electric field generation device that can generate a straight-line electric field and work to the outside without generating a magnetic field.

Additionally, one aspect of the present invention provides a null circuit that cancels the voltage across the ends of a secondary conductor to zero volt by generating a vector potential field without generating a magnetic field.

A further aspect of the present invention provides a structure for a vector potential generation device that can generate a vector potential field without generating a magnetic field.

Solution to Problem

A vector potential generation device of one aspect of the present invention may include a vector potential coil formed by a solenoid coil formed by a wound conductor and a power supply electrically connected between two terminals of the vector potential coil. The vector potential coil is wound circularly around a base body, of which at least a part contacting the solenoid coil has an insulating property. The vector potential generation device may be configured to passed a current through the vector potential coil to place the inside of the internal space formed by the winding structure of the vector potential coil in substantially a non-magnetic field state, and to generate a vector potential in the internal space.

A vector potential generation device of a second aspect of the present invention may be the vector potential generation device of the first aspect, further having a return current conductor that is placed in series connection with the solenoid coil and that returns a current that is the same as the current flowing in the vector potential coil and in the opposite direction thereto.

A vector potential generation device of a third aspect of the present invention may be the vector potential generation device of the second aspect, wherein the return current conductor is placed so as to pass through an internal space formed by the winding structure of the solenoid coil.

A vector potential generation device of a fourth aspect of the present invention may be the vector potential generation device of the second aspect, wherein the return current conductor is placed coaxially with the winding structure of the solenoid coil and wound in a direction that is opposite to the winding direction of the solenoid coil with respect to the direction of progression of current.

A vector potential generation device of a fifth aspect of the present invention may be the vector potential generation device of any one of the first aspect to the fourth aspect, having a location made of a high-permeability material inside the winding structure.

A vector potential generation device according to a sixth aspect of the present invention may be the vector potential generation device according to the second aspect, wherein the return current conductor is wound around the base body around which the solenoid coil is wound circularly, and the winding direction of the return current conductor is the same as the winding direction of the solenoid coil with respect to the direction of the progression of the current.

A vector potential generation device of a seventh aspect of the present invention may be the vector potential generation device of any one of the first aspect to the sixth aspect, wherein the base body is cylindrical.

A vector potential generation device of an eighth aspect of the present invention may be the vector potential generation device of any one of the first aspect to the sixth aspect, wherein the base body is donut-shaped.

A vector potential generation device of a ninth aspect of the present invention may be the vector potential generation device of any one of the first aspect to the sixth aspect, wherein the base body is disc-shaped.

A vector potential generation device of a tenth aspect of the present invention may be the vector potential generation device of any one of the first aspect to the sixth aspect, wherein the base body is spherical or polyhedral.

A vector potential transformer of an eleventh aspect of the present invention may have the vector potential generation device of any one of the seventh, ninth, and tenth aspects, and a secondary conductor placed inside a cylindrical, disc-shaped, spherical, or polydrehal base body. The two ends of the second conductor may lead out from different end parts of the base body.

A shield permeation device of a twelfth aspect of the present invention may have the vector potential transformer of the eleventh aspect, wherein the second conductor of the vector potential transformer is placed in the longitudinal direction inside a tubular metal, which has a smaller diameter than the base body.

A vector potential transformer of a thirteenth aspect of the present invention may have the vector potential generation device of the eighth aspect and a secondary conductor placed in parallel in the toroidal direction inside the donut-shaped base body.

A non-contact space electric field generation device of a fourteenth aspect of the present invention may have the vector potential generation device of any one of the seventh, ninth, and tenth aspects. An alternating current may be passed through the vector potential coil so as to generate an electric field proportional to the time differential of the alternating current and having a direction that is parallel to the axis of the vector potential coil.

A null circuit of a fifteenth aspect of the present invention may have a vector potential generation device of any one of the seventh, ninth, and tenth aspects and a secondary conductor placed inside the base body. The input and output terminals of the second conductor may both lead out from the same end part of the base body. A current may be passed through the vector potential coil so as to cancel the voltage across the two ends of the second conductor, without dependence on a signal applied to the vector potential coil or on the arrangement of the secondary conductor inside the cylinder.

A vector potential generation device according to a sixteenth aspect of the present invention may be the vector potential generation device of any one of the first aspect to the tenth aspect, from which the base body is omitted.

A structure for a vector potential generation device of the seventeenth aspect of the present invention, wherein the base body and the power supply may be omitted from the vector potential generation device of any one of the first aspect to the tenth aspect.

Advantageous Effects of Invention

In a vector potential generation device of one aspect of the present invention, the solenoid coil in which a conductor is wound is further wound circularly. By doing this, when a current is passed through the vector potential coil, a state is created in which magnetic flux is circularly placed. Outside the solenoid coil, although there is no magnetic field, a vector potential does exist. By further circularly winding the solenoid coil, a parallel vector potential is generated in the internal space formed by the winding structure. As a result, one aspect of the present invention can provide a vector potential generation device in which a substantially non-magnetic field state is created in the internal space formed by the winding structure of the vector potential coil, and a vector potential is generated in the internal space.

Additionally, one aspect of the present invention can provide a vector potential transformer that, by having such a vector potential generation device, transfers energy or a signal, without generating a magnetic field.

Additionally, one aspect of the present invention can provide a shield permeation device that transfers energy or a signal by having the above-described vector potential transformer, without generating a magnetic field.

Additionally, one aspect of the present invention can provide a non-contact space electric field generation device that, by having such a vector potential generation device, generates an electric field without contact and without generating a magnetic field.

Additionally, one aspect of the present invention can provide a null circuit that, by having such a vector potential generation device, cancels the voltage across the ends of the secondary conductor to zero volt, without being influenced by the current.

Additionally, in a vector potential generation device of one aspect of the present invention, if the solenoid coil itself is constituted by a rigid member, because it can maintain its shape even without a base body, the above-described operating mechanism and effect are achieved.

Additionally, the structure for the vector potential generation device of one aspect of the present invention can be provided with a constitution that omits the base body and the power supply from the above-described vector potential generation device. For example, if the structure itself is self-supporting, the base body is not necessary and, alternatively, the base body becomes unnecessary even if an object involved in the generated vector potential is used in place of the base body. Also, by using electrical energy supplied from an object in the vicinity of the structure is used in place of the power supply, the structure of the present invention can be used as a structure for a vector potential generation device.

DESCRIPTION OF EMBODIMENTS

In the following, one aspect of the present invention as a vector potential generation device, a vector potential transformer, a non-contact space electric field generation device, and a null circuit according to an embodiment of the present invention will be described, with references being made to drawings.

Vector Potential Generation Device

First Embodiment

The Case of a Cylindrical Base Body (1-1) Basic Constitution

Figure 1:
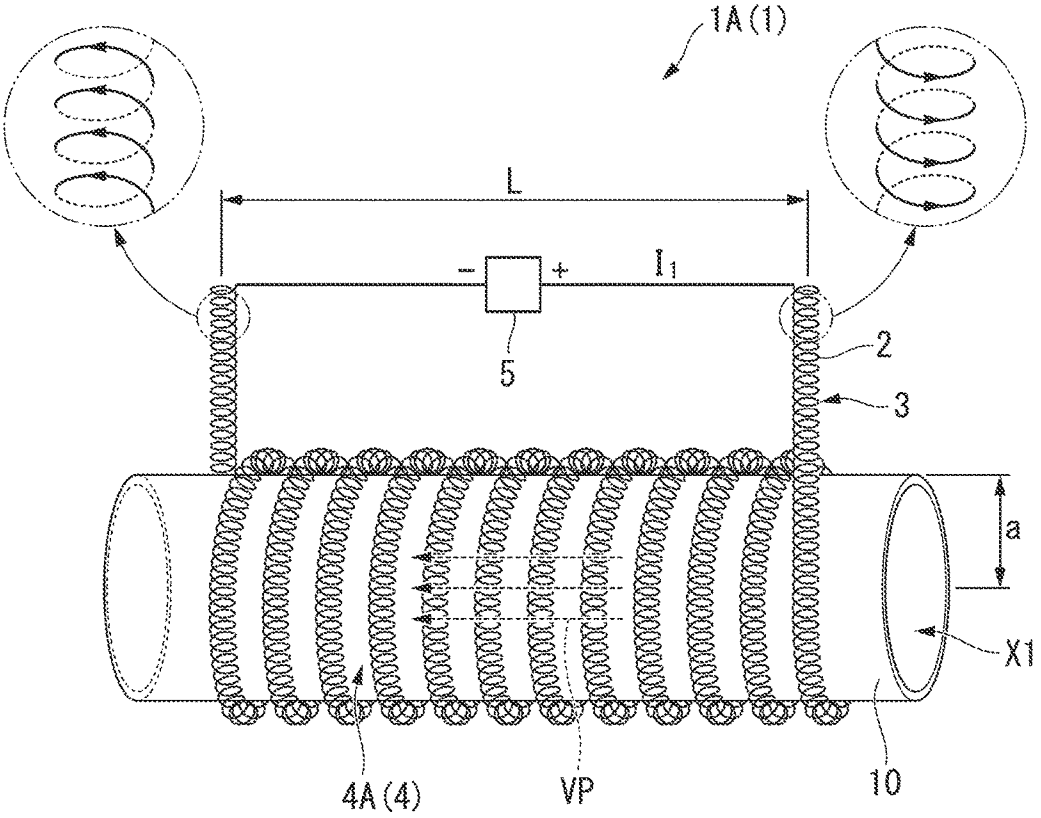
FIG. 1 shows an example of a vector potential generation device according to a first embodiment.

FIG. 1 shows, in schematic form, an example of the constitution of a vector potential generation device according to the first embodiment.

The vector potential generation device 1A(1) includes a vector potential coil 4 formed by a solenoid coil 3 formed by a wound conductor 2, for example, wound circularly around the base body 10, of which the part in contact with the solenoid coil 3 has an insulating property, and a power supply 5 electrically connected between two terminals of the vector potential coil 4. The power supply 5 may be either direct current or alternating current.

Although the description that follows is premised on the direction of winding of the helix of the conductor 2 being "left-winding," as shown in FIG. 1, even for the reverse direction (right-winding), the operating mechanism and effect of the present invention are achieved (although the vector potential to be generated (indicated by the dotted line arrows) will be in the reverse direction).

In the vector potential generation device 1A(1), passing a current through the vector potential coil 4 places the internal space X1 formed by the winding structure of the vector potential coil 4 into a substantially non-magnetic field state, and generates the vector potential VP (indicated by the dotted line arrows in FIG. 1) within the internal space X1.

The base body 10 may have an insulating property in at least the part making contact with the solenoid coil 3, and there is no particular restriction regarding the material thereof. For example, the base body 10 itself may be constituted by an insulating material, or the surface of the base body 10 may be covered with an insulating layer.

Although the shape of the base body 10 is not particularly restricted, the example of a cylindrical base body 10 will be described in the first embodiment.

The solenoid coil 3 is formed by the winding of the conductor 2. When winding, in order to prevent short circuiting between neighboring parts of the conductor 2, the surface of the conductor 2 may be covered by an insulating layer (not shown).

The vector potential coil 4 is formed by winding the solenoid coil 3 around the cylindrical base body 10. In this case, the vector potential coil 4 of the first embodiment, which forms a cylindrical shape, will be referred to as the vector potential solenoid coil 4A(4).

When a current is passed through a vector potential solenoid coil 4A(4) such as this, the magnetic flux is circularly placed. Although there is no magnetic field on the outside of the solenoid coil 3, there is a vector potential VP. By further circularly winding the solenoid coil 3, a parallel vector potential VP is generated in the internal space X1 formed inside the winding structure. As a result, in the vector potential generation device 1A(1) of the first embodiment, in addition to being able to place the inside of the internal space X1, which is formed by the winding structure of the vector potential solenoid coil 4A(4), into substantially the non-magnetic field state, the vector potential VP can be generated within the internal space X1.

In general, as shown in Equation (1), the magnetic flux density B is given by the rotation of the vector potential A (VP in the drawing).

Equation 1

$$B=\mathrm{rot}A \tag{1}$$

In contrast, the relationship between the current density J and the magnetic field H is given by Equation (2).

Equation 2

$$J=\mathrm{rot}H \tag{2}$$

From these relationships, the relationship between the vector potential and the current density is given by Equation (3).

Equation 3

$$\mu_0 J=\mathrm{rotrot}A \tag{3}$$

In the above, J is the current density, and $\mu_0$ is permeability in a vacuum.

The vector potential had been thought of as being only a convenience in the above-noted calculation, with no substance. Subsequently, Aharonov and Bohm theoretically predicted that the vector potential changes the phase of the wave function of an electron. This is what is known as the Aharonov-Bohm effect (AB effect).

Subsequently as well, it has been thought that a vector potential is valid only in a microscopic world, which has not been observable other than in a quantum mechanics field, such as in the Aharonov-Bohm effect.

The above-described vector potential equations can be interpreted as the magnetic field surrounding a current and the further vector potential surrounding the outside of the magnetic field. Although the vector potential rotates within an extremely complex space when a current is passed, a reverse structure can be envisioned that does unraveling, so that the vector potential has a simple structure within the space.

The base body structure is the vector potential solenoid coil 4A(4) (hereinafter referred to also as a double solenoid) formed by a solenoid coil 3 formed by winding a wound conductor 2 wound circularly around the base body 10, of which at least the part in contact with the solenoid coil 3 has an insulating property.

According to the vector potential solenoid coil 4A(4), the structure is such that, when a current is passed therethrough, the current does not exhibit eddying, but rather the magnetic flux exhibits eddying.

Although a magnetic field does not exist on the outside of the solenoid coil 3, a vector potential does exist there. By further circularly winding the solenoid coil 3, a parallel vector potential is generated in the internal space X1 formed inside the winding structure.

If an infinitely long solenoid coil 3 is assumed, although there is a magnetic flux within the space inside the solenoid coil 3, there is no magnetic flux existing outside thereof. However, because a vector potential exists in the space surrounding a conductor in a direction parallel to the direction of the current, it exists in the internal space of and also outside of the solenoid coil 3. If we look at the inside space formed by the winding structure of the solenoid coil 3, because the vector potential of conductors 2 of the solenoid coil 3 facing each other are of opposite directions, vector potential rotation occurs, and magnetic flux is generated in the internal space of the solenoid coil 3.

In a general solenoid coil, although the current is solenoidal, in the vector potential solenoid coil 4A(4) of the first embodiment, because the solenoid coil 3 is further wound circularly, the magnetic flux is solenoidal.

Given this, the inventors generated a straight-line vector potential by overlapping the vector potential on the outside of the solenoid coil 3 within the cylindrical internal space of the vector potential solenoid coil 4A(4).

The magnetic field H of a normal finite-length solenoid coil, in contrast to the “double solenoid” of the present invention, is given by Equation (4).

Equation 4

$$H=\frac{N_1 I}{2}(\cos\theta_2-\sin\theta_1) \tag{4}$$

In the above, $N_1$ is the number of turns of the coil per unit length, and I is the current. The $\theta_1$ and $\theta_2$ are the angles when each of the ends of the coil are viewed from an arbitrary point on the coil axis.

Next, the magnetic flux $\Phi$ in the internal space of an infinitely long solenoid coil is the limit value of Equation (4), this being given by the following Equation (5).

Equation 5

$$\Phi=\mu_0 nSI_m\sin(\omega t) \tag{5}$$

In the above, $\mu_0$ is the permeability in a vacuum, n is the number of turns per unit length, and S is the cross-sectional area of the solenoid coil 3. If the current is thought to be an alternating current, $I_m$ is the current amplitude, $\omega$ is angular frequency, and t is the time.

The magnetic flux in the hole part of the solenoid coil 3 shown in FIG. 1 is also given by Equation (5).

In order to understand the relationship between current, vector potential, and the magnetic field space, it can be predicted from similarity from the above-described Equation (1) and Equation (2) that H corresponds to A and that I corresponds to $\Phi$.

By these relationships of correspondence, changing the variables and substituting Equation (5) into Equation (4), it is thought that the magnitude A of the vector potential VP on the central axis of the vector potential solenoid coil 4A(4) is given by the following Equation (6).

Equation 6

$$A=\frac{\mu_0 nN_1 S}{2}(\cos\theta_2-\cos\theta_1)I_m\sin(\omega t) \tag{6}$$

The electric field E by this vector potential, as shown in Equation (7), is given by the time differential of the vector potential.

Equation 7

$$E=-\frac{\partial A}{\partial t}=-\frac{\mu_0 nN_1 S\omega I_m\cos(\omega t)}{2}(\cos\theta_2-\cos\theta_1) \tag{7}$$

In the above, $\cos\theta_1$ and $\theta_2$ are defined by Equation (8) and Equation (9), respectively.

Equation 8

$$\cos\theta_1 = \left(z - \frac{L}{2}\right)\left[\alpha^2 + \left(z - \frac{L}{2}\right)^2\right]^{-\frac{1}{2}} \tag{8}$$

Equation 9

$$\cos\theta_2 = \left(z + \frac{L}{2}\right)\left[\alpha^2 + \left(z + \frac{L}{2}\right)^2\right]^{-\frac{1}{2}} \tag{9}$$

In the above, L is the length of the vector potential solenoid coil 4A(4), A is the radius of the vector potential solenoid coil 4A(4), and z is the distance in the direction parallel to the central axis of the vector potential solenoid coil 4A(4).

With a vector potential generation device 1A(1) such as this, because the electron phase can be varied, spin control is possible in an atomic magnetometer or in nuclear magnetic resonance. In contrast to a magnetic field, because precession is not induced, highly precise, high-speed spin control is possible. For example, if the vector potential generation device 1A(1) is used for particle acceleration, a superconducting coil can be used to generate a vector potential and the current can be varied with time.

Figure 2:
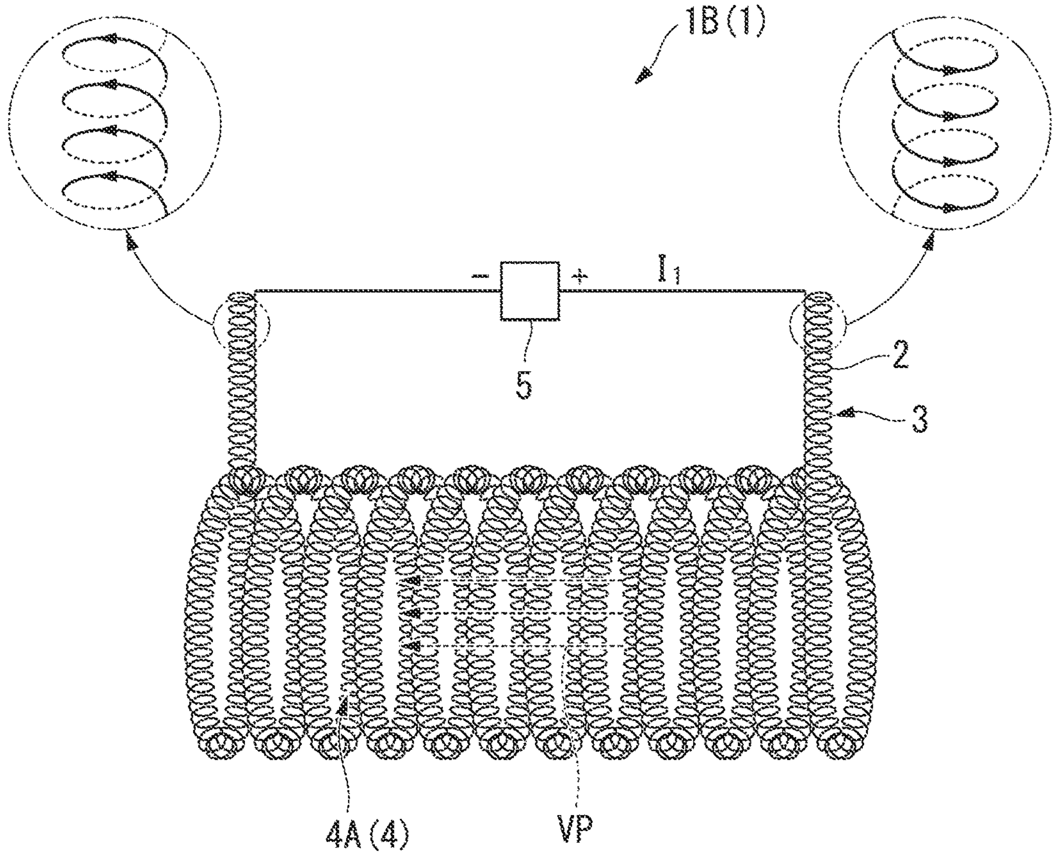
FIG. 2 shows another example of the generation device shown in FIG. 1.

(1-2) Constitution Omitting the Base Body: FIG. 2

FIG. 2 shows another example of the vector potential generation device shown in FIG. 1. The vector potential generation device 1B(1) shown in FIG. 2 is an example of the vector potential generation device 1A(1) with the base body 10 omitted therefrom.

With the vector potential generation device 1B(1) shown in FIG. 2, if the solenoid coil 3 itself is constituted by a rigid material, the shape thereof is maintained without the existence of a "base body." That being the case, the vector potential generation device 1B(1) of FIG. 2 has the same operating mechanism and effect as the generation device 1A(1) of FIG. 1. The "base body" for maintaining the shape of the solenoid coil 3 is not necessarily required. Because the solenoid coil 3 can be spatially self-supporting, even with a constitution that omits the "base body," the vector potential generation device 1B(1) of the present invention can achieve the operating mechanism and effect as described above, that is, the operating mechanism and effect of "in addition to being able to place the inside of the internal space formed by the winding structure of the vector potential coil into substantially the non-magnetic field state, a vector potential can be generated within the internal space."

Figure 3:
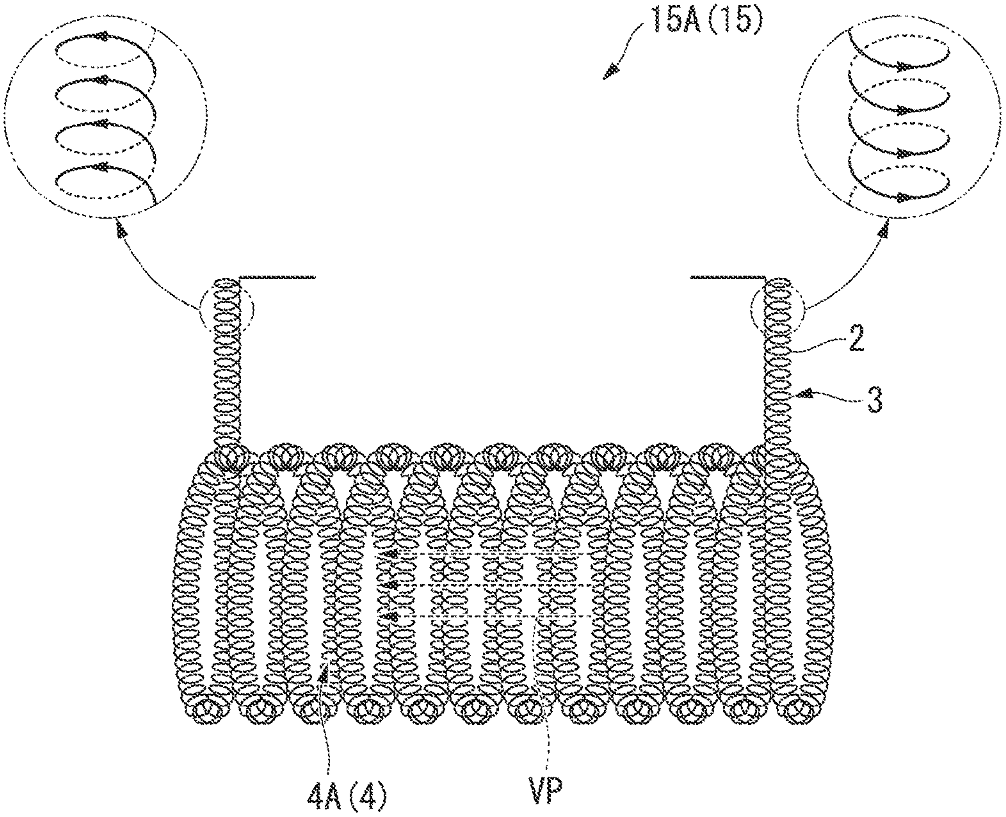
FIG. 3 shows an example of a structure for the generation device shown in FIG. 1.

(1-3) Constitution Omitting the Base Body and the Power Supply: FIG. 3

FIG. 3 shows an example of a structure for the vector potential generation device shown in FIG. 1. The structure 15A(15) for the vector potential generation device shown in FIG. 3 is the vector potential generation device 1A(1) of FIG. 1, with the base body 10 and the power supply 5 omitted therefrom. The structure 15A(15) shown in FIG. 3 does not require the "base body" if itself is self-supporting. Alternatively, even if it is not self-supporting, if an object involved in the generated vector potential can be used in place of the "base body," the structure 15A(15) itself need not have the "base body." If the structure 15A(15), for example, can obtain electric energy from an object in its vicinity, that object can be used in place of the "power supply," thereby making the structure 15A(15) effectively usable as a "structure for a vector potential generation device."

Figure 4:
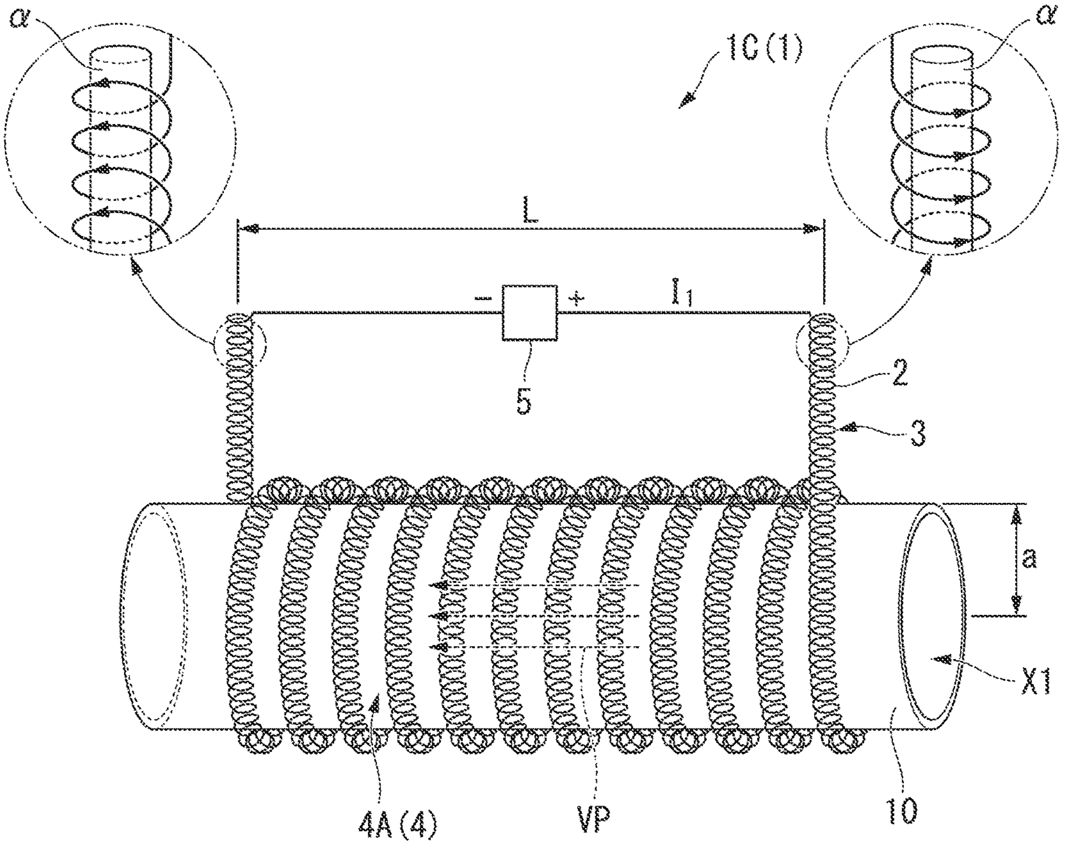
FIG. 4 shows another example of the generation device shown in FIG. 1.

(1-4) Constitution Providing a High-Permeability Material within the Winding Structure of the Solenoid Coil: FIG. 4

FIG. 4 shows another example of the vector potential generation device shown in FIG. 1. The vector potential generation device 1C(1) of FIG. 4 is a constitution example differing from the vector potential generation device 1A(1) of FIG. 1 only with regard to the point of having a component α made of a high-permeability material inside the winding structure of the solenoid coil 3.

The vector potential generation device 1C(1) shown in FIG. 4 has a component α (cylindrically shaped in the case of FIG. 4) made from a high-permeability member inside the winding structure of the solenoid coil 3. Providing the component α increases the magnetic flux generated within the solenoid coil 3. The increase in magnetic flux provides generation of a strong vector potential, even with a small current passing through the solenoid coil 3. The component α is not restricted to being cylindrical, and the same operating mechanism and effect are achieved even with a different shape (for example, a square column shape or tubular shape).

Figure 5:
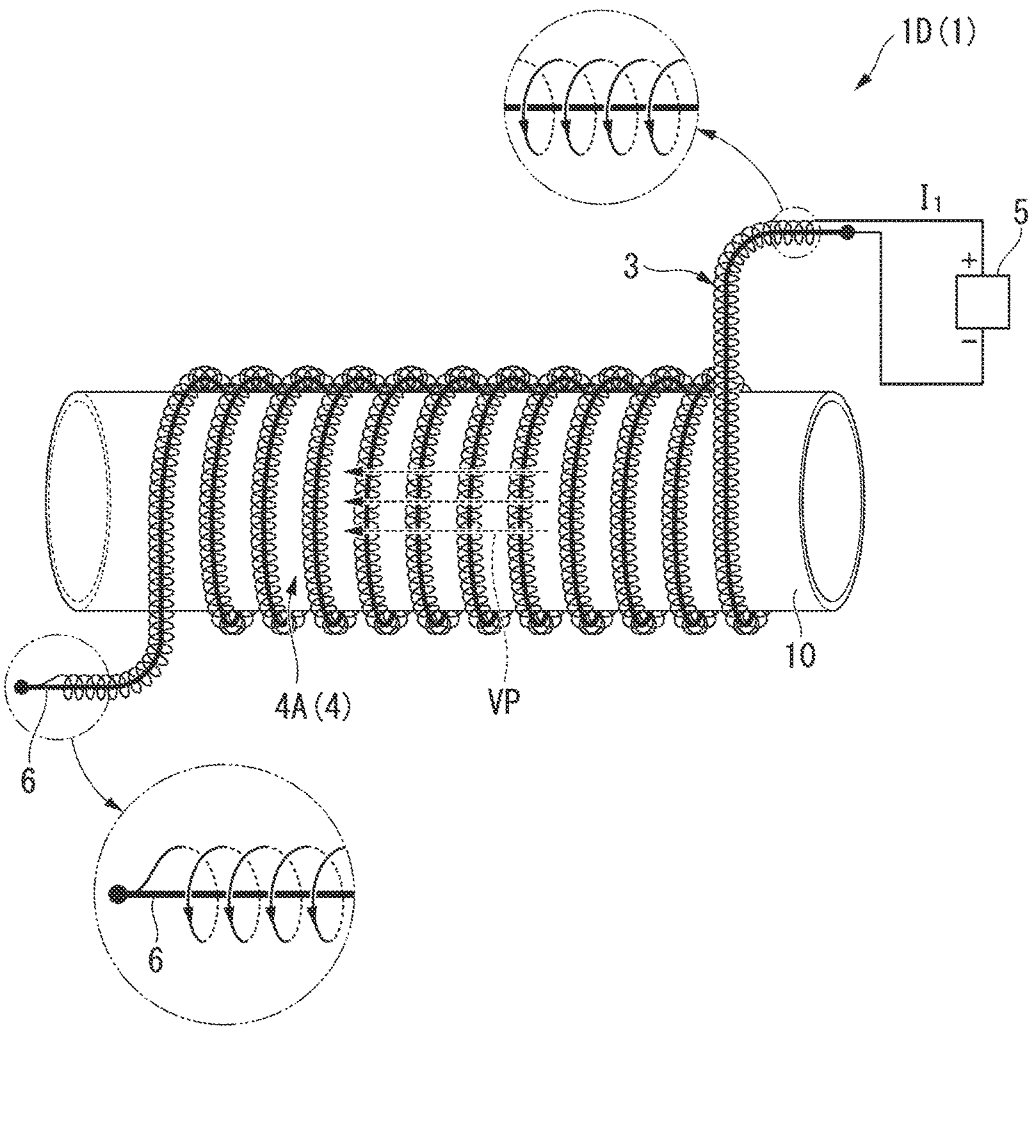
FIG. 5 shows another example of the generation device shown in FIG. 1.

(1-5) Constitution Providing a Return Current Conductor within the Winding Structure of the Solenoid Coil: FIG. 5

FIG. 5 shows, in schematic form, another example of the constitution of the vector potential generation device 1 according to the first embodiment. The vector potential generation device 1D(1) of FIG. 5 is a constitution example differing from the vector potential generation device 1A(1) of FIG. 1 only with regard to the point of further having a return current conductor 6 in which a current the same as that flowing in the vector potential coil 4 and of the opposite direction is returned in the internal space of the winding structure of the solenoid coil 3. To prevent contact with and short circuiting to the neighboring conductor 2, the surface of the return current conductor 6 may be covered by an insulating layer (not shown).

By further providing the return current conductor 6 and by returning a current that is substantially the same current as that flowing in the vector potential coil 4 but of the opposite direction, it is possible to cancel out the magnetic field generated in the overall coil by the current and to obtain a vector potential VP in which the occurrence of a parasitic magnetic field is suppressed.

As will be described later, if a secondary conductor (secondary coil) is placed within the internal space of the cylindrical base body 10, depending on the orientation of the vector potential VP and on the winding direction of the secondary coil, there is a magnetic field output by the superimposition of the second coil output signal onto the magnetic field signal. In contrast, by passing a return current through the solenoid coil 3, it is possible to obtain only a voltage derived from the vector potential.

For example, with the vector potential generation device 1D(1) shown in FIG. 5, the return current conductor 6 is placed so as to pass through the internal space formed by the winding structure of the solenoid coil 3.

At the end parts of the solenoid coil 3 the conductor 2 forming the solenoid coil 3 and the return current conductor 6 are electrically connected by, for example, welding.

To prevent shorting to a neighboring conductor, the surface of the return current conductor 6 may be covered with an insulating layer (not shown).

Figure 6:
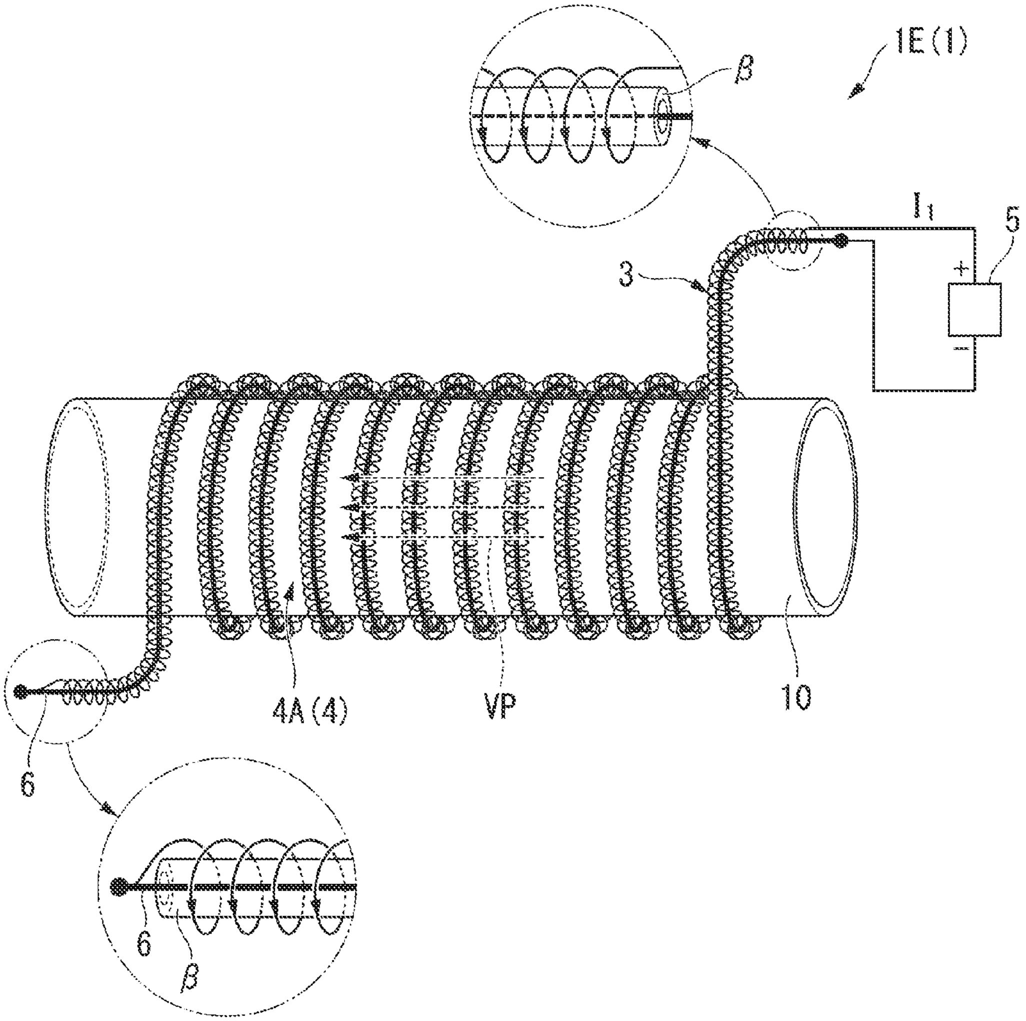
FIG. 6 shows another example of the generation device shown in FIG. 1.

(1-6) Constitution Providing a Return Current Conductor and a High-Permeability Material Inside the Winding Structure of the Solenoid Coil: FIG. 6

The vector potential generation device 1E(1) shown in FIG. 6 is an example of a constitution in which a tubular component β made of a high-permeability material is placed between the return current conductor 6 and the solenoid coil 3. Providing the component β increases the magnetic flux generated within the solenoid coil 3. The increase in magnetic flux provides generation of a strong vector potential, even with a small current passing through the solenoid coil 3.

Figure 7:
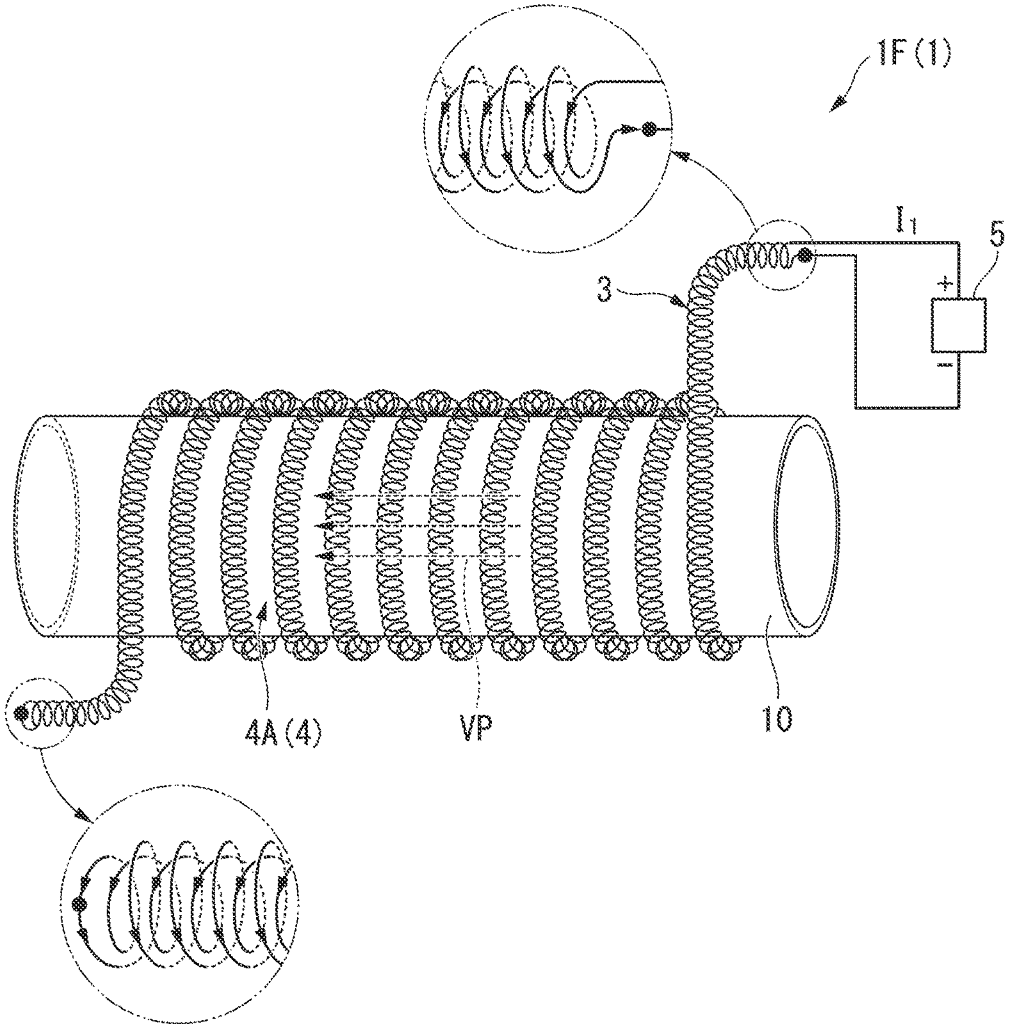
FIG. 7 shows another example of the generation device shown in FIG. 1.

(1-7) Conductor for a Return Current, Type B (Double Solenoids): FIG. 7

The vector potential generation device 1F(1) shown in FIG. 7 is an example of a constitution that differs from the vector potential generation device 1A(1) of FIG. 1 only with regard to the point of the return current conductor in the vector potential generation device 1F(1) being placed to be coaxial with the winding structure of the solenoid coil and wound in a direction that is opposite to the winding direction of the solenoid coil.

Because the returning current in the vector potential generation device 1F(1) shown in FIG. 7 generates a vector potential that is in the same direction as the vector potential generated by the current in the forward path, there is an advantage that these are added and increase the vector potential.

Figure 8:
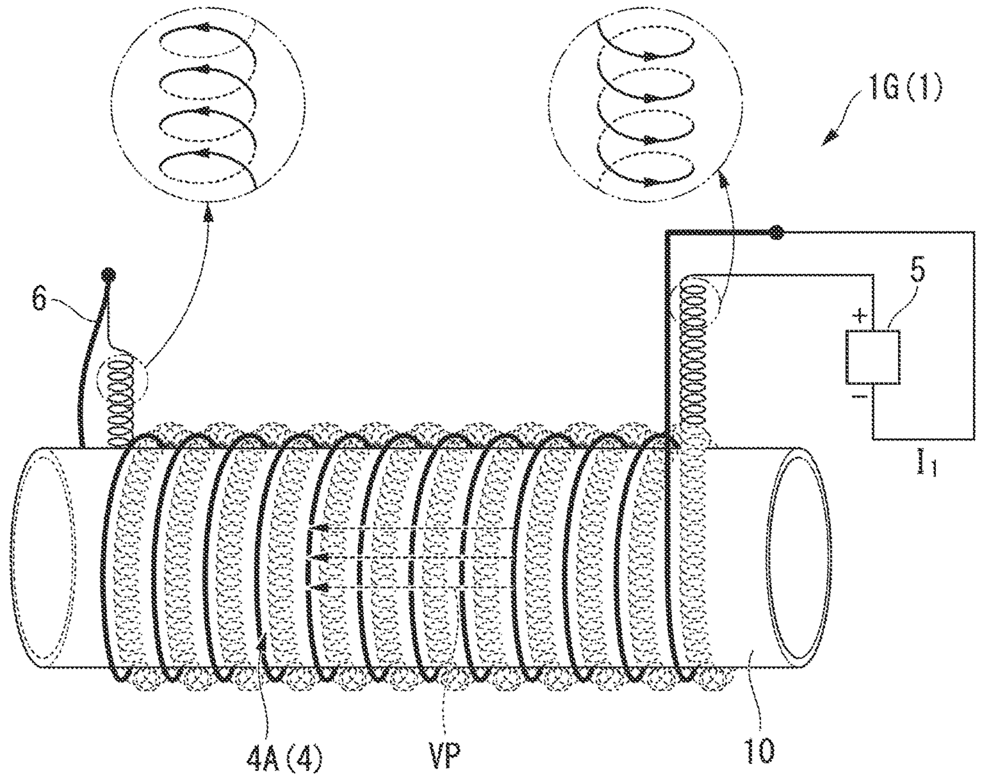
FIG. 8 shows another example of the generation device shown in FIG. 1.

(1-8) Conductor for a Return Current, Type C (Same Winding Direction Parallel Along the Base Body): FIG. 8

The vector potential generation device 1G(1) shown in FIG. 8 is an example of a constitution that differs from the vector potential generation device 1A(1) of FIG. 1 only with regard to the point of the return current conductor of the vector potential generation device 1G(1) being placed so that, along the base body on which the solenoid coil is wound circularly, the winding direction is in the same direction as the direction of flow of the current. That is, in the vector potential generation device 1G(1) shown in FIG. 8, the return current conductor 6 is placed so as to be wound on the base body 10 in parallel with the solenoid coil 3.

In the vector potential generation device 1G(1) shown in FIG. 8, because the return current conductor need not be placed inside of the solenoid coil, there is the advantage that the manufacture of the solenoid coil is simplified.

(1-9) Use of a Secondary Conductor (Vector Potential Transformer)

Figure 9:
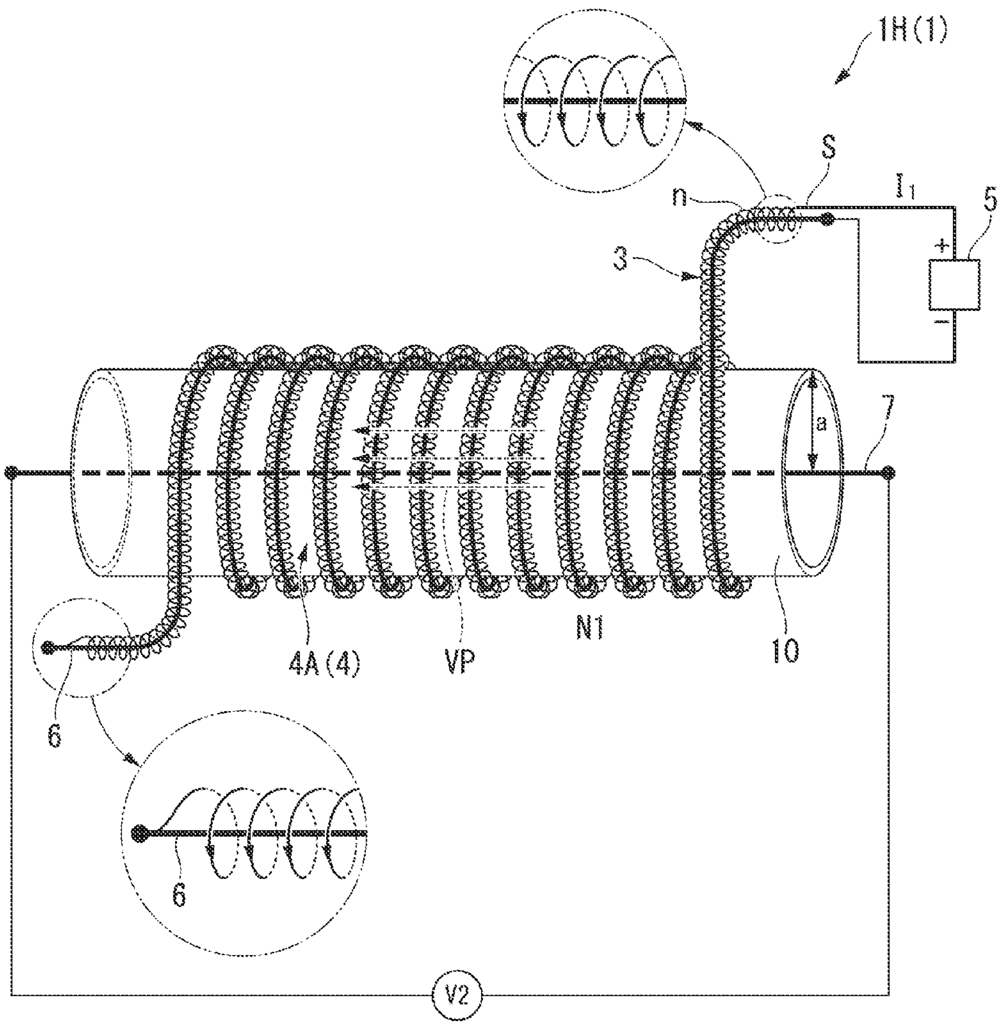
FIG. 9 shows another example of the generation device shown in FIG. 1.

FIG. 9 shows, in schematic form, another example of the constitution of a vector potential generation device 1H(1). As will be described later, the vector potential generation device 1H(1) functions as a vector potential transformer.

The vector potential generation device 1H(1) has the vector potential generation device 4A(4) and a secondary conductor 7 is placed in the internal space of the cylindrical base body 10, and the two ends of the secondary conductor 7 lead out from different end parts of the base body 10.

If the secondary conductor 7 is placed in the z direction along the central axis of the vector potential generation device 4A(4) (length L), the voltage $V_2$ that is the accumulation of the electric field E is generated across the ends thereof. The voltage $V_2$ is expressed by Equation (10).

Equation 10

$$V_2=-\int_{-L/2}^{L/2}E\cdot dz \tag{10}$$

That is, this is a vector potential transformer with a secondary conductor of one turn.

Equation 11

$$V_2=\frac{\mu_0 nN_1 S\omega I_m\cos(\omega t)}{2}\int_{-L/2}^{L/2}\left[\left(z+\frac{L}{2}\right)\left[\alpha^2+\left(z+\frac{L}{2}\right)^2\right]^{-\frac{1}{2}}-\left(z-\frac{L}{2}\right)\left[\alpha^2+\left(z-\frac{L}{2}\right)^2\right]^{-\frac{1}{2}}\right]dz \tag{11}$$

Equation 12

$$V_2=\mu_0 nN_1 S\omega\left(\sqrt{\alpha^2+L^2}-\alpha\right)I_m\cos(\omega t) \tag{12}$$

In this manner, when an alternating current is passed though the vector potential solenoid coil 4A(4), an alternating current voltage is generated in the straight conductor 7, which is placed in the cylindrical space. A magnetic field does not exist in the cylindrical space. The orientation of the vector potential is parallel with the axis of the vector potential solenoid coil 4A(4).

The same signal as with a straight conductor is detected if a secondary conductor 7 of an arbitrary shape is placed in parallel with the internal space of the cylindrical base body 10. A voltage that is the curvilinear integral in a direction parallel to the axis of the vector potential coil is generated. That is, the same thing as electromagnetic induction can occur at a location at which no magnetic field exists.

In this manner, using the vector potential generation device 1A(1), it is possible to constitute a vector potential transformer (the vector potential generation device 1H(1) shown in FIG. 9).

Figure 10:
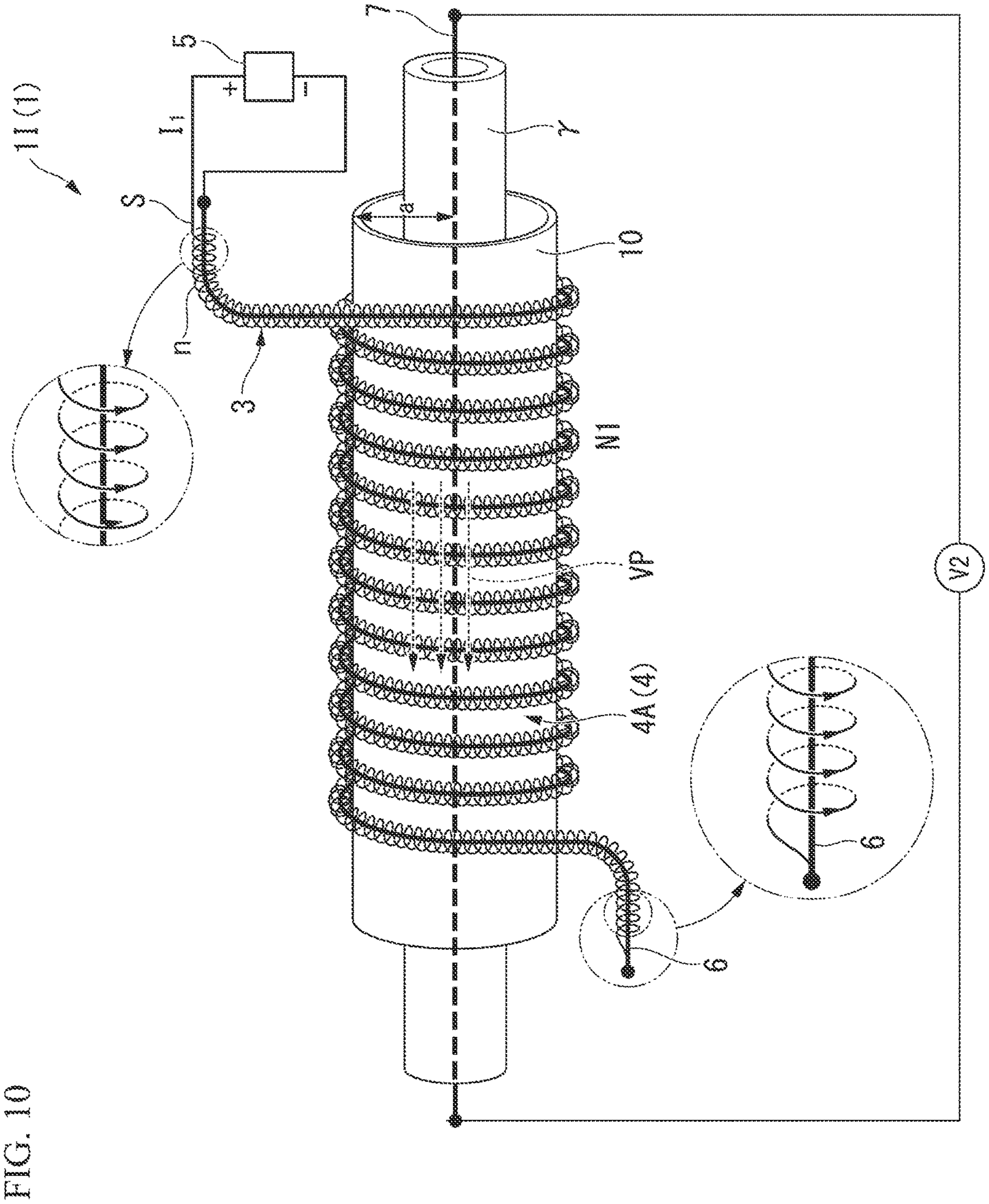
FIG. 10 shows another example of the generation device shown in FIG. 1.

The shield permeation device 1I(1) shown in FIG. 10 has the above-described constitution of FIG. 9, which "has a vector potential generation device and a secondary conductor 7 is placed in the internal space of the cylindrical base body 10 and in the vector potential transformer in which the two ends of the secondary conductor 7 lead out from different end parts of the base body 10," further the secondary conductor 7 of the vector potential transformer is placed in the internal space of a tubular metal (referred to also as the conductor γ), which has smaller diameter than the base body 10, in the longitudinal direction.

Stated differently, the shield permeation device 1I(1) of FIG. 10 is an example of a constitution, in which a tubular conductor γ made of a metal (for example, aluminum (Al)) is provided so as to surround the secondary conductor 7 in the internal space of the cylindrical base body 10.

The secondary conductor 7 is covered using the conductor γ (hereinafter referred to also as a shield), and it was verified that even if this conductor γ was grounded (not shown), a voltage equal to the case in which there is no shield on the secondary conductor 7 is induced.

This verification was made using a conductor γ having a thickness of 1 mm. The skin thickness of aluminum at 10 kHz is 0.85 mm. In the same manner, it was verified that even with brass having a thickness of 10.5 mm, the same voltage is generated as with no shield. That is, it was learned that, in the case of vector potential, even if shielding is done with a metal that is thicker than the skin thickness, there is no shielding effect.

The length of the tubular conductor γ is sufficiently long with respect to the length of the vector potential generation device, and there is no influence from wrap-around at the end parts. The experimental results mean that propagation of energy or a signal is possible even with covering by a conductor. That being the case, the shield permeation device according to the present invention is useful, for example, non-destructive testing, medical diagnosis, and undersea communication.

Figure 11:
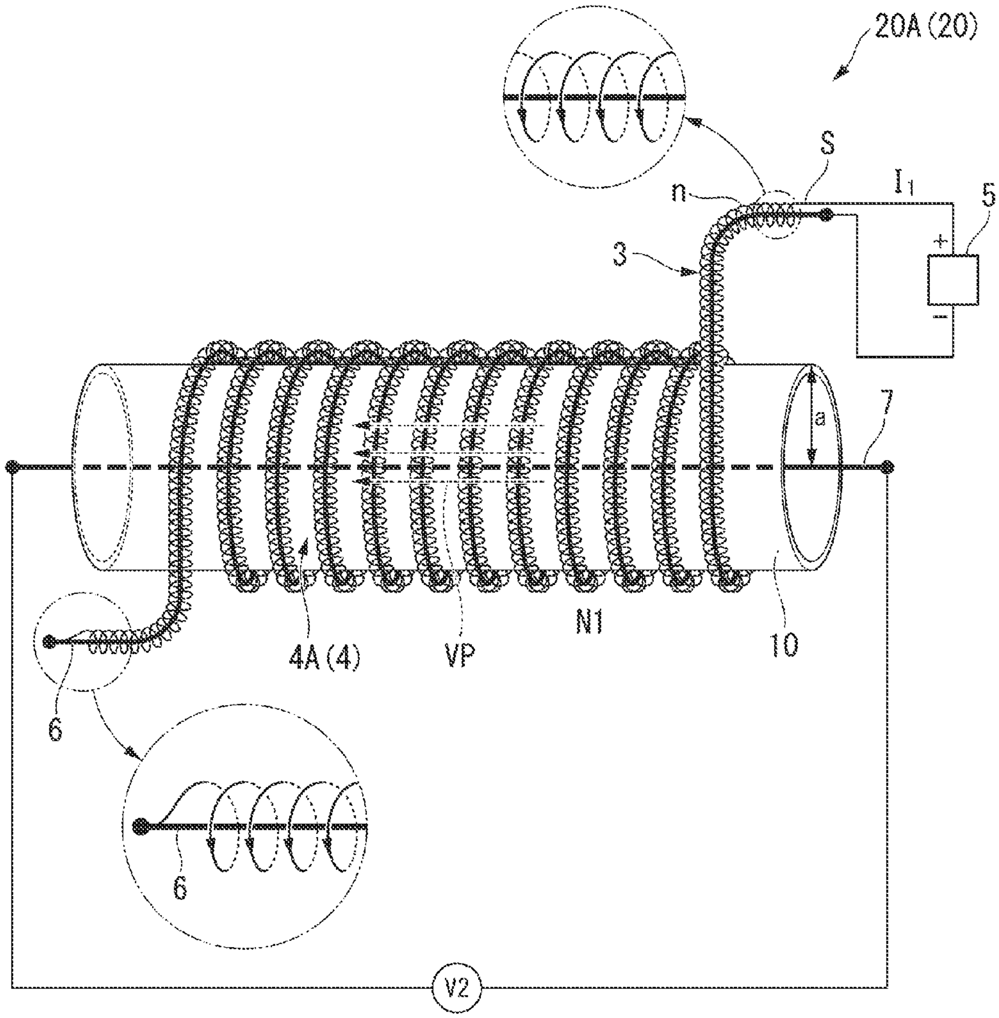
FIG. 11 shows an example of a vector potential transformer according to the first embodiment.

FIG. 11 shows an example of a vector potential transformer according to the first embodiment. A vector potential transformer 20A(20) (vector potential solenoid transformer) of the present invention has a vector potential solenoid coil 4 and a secondary conductor 7 is placed in the internal space of the cylindrical base body 10, and the ends of the secondary conductor 7 lead out from different ends of the base body 10.

A transformer is a device that arbitrarily converts an alternating voltage and current. As such, the transformer is an indispensable device in movement of electrical energy and conversion of electrical signals. Although they use magnetism, according to the present invention a transformer can be implemented in which a magnetic field is not generated.

A vector potential transform such as the vector potential transformer 20A(20), which does not generate a magnetic field, is effective in medicine and high-precision measurements. For example, although a nuclear magnetic resonance apparatus used in medical locations is extremely sensitive to magnetic field disturbance, it is possible to use the transformer of the present invention even in such environments, making it suitable for such applications.

Experimental Example 1

Experiments were conducted to verify that, regarding a vector potential solenoid coil such as described above, the inside of the internal space of the coil is substantially in the non-magnetic field state and also that a vector potential is generated inside the internal space.

With a current of $\omega=6.283\times10^4$ rad/s and $I_m=1.09\ A_{PP}$ input to a vector potential solenoid coil of $N_1=227$ turns, $n=710$ turns/m, $S=7.07\times10^{-6}\ m^2$, $a=0.021$ m, and $L=0.22$ m, an open-circuit voltage of $V_2=21\ mV_{PP}$ was measured across the two ends of the secondary conductor is placed in a straight line in the internal space of the vector potential coil. This value of 21 $mV_{PP}$ coincides well with the theoretical value of 19.7 $mV_{PP}$ that was calculated by Equation (12).

Figure 12:
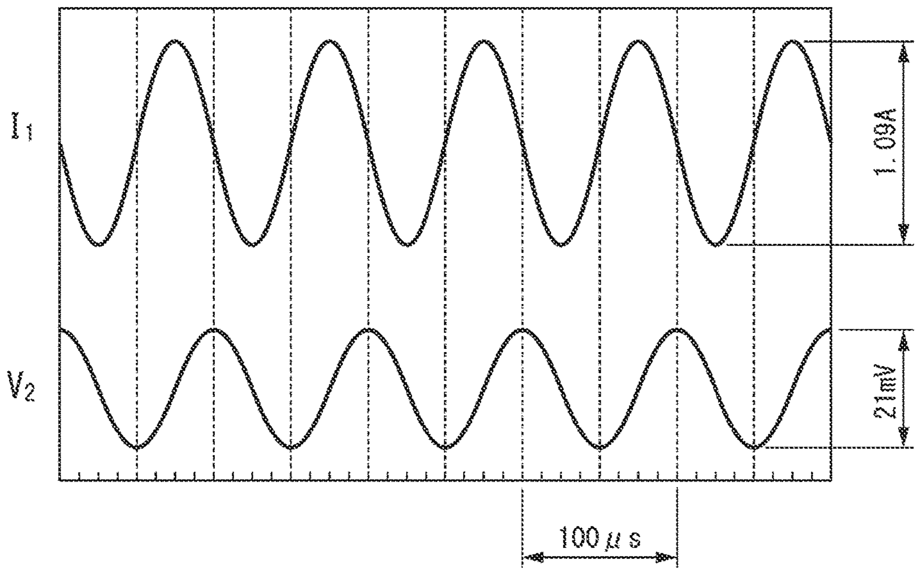
FIG. 12 shows an oscillograph of the output signal when current is passed through the generation device shown in FIG. 1.

FIG. 12 shows the waveforms measured using an oscilloscope. The upper waveform is the primary current of the vector potential solenoid coil 4A(4), and the lower waveform is the open-circuit voltage across the ends of the secondary conductor.

In the oscilloscope waveforms shown in FIG. 12, the time differential of the current I results in the voltage V with a reversed polarity, and the voltage generated across the secondary conductor is generated in the direction that prevents a change in the vector potential. This is the vector potential version of the so-called Lenz's Law.

As is clear from FIG. 12, the phase of the current I and the phase of the voltage V are offset by 90 degrees. This is the representation that the time differential of the vector potential generated in the vector potential solenoid coil 4A(4) generates the secondary voltage.

(Verification of the Absence of a Magnetic Field in a Solenoid Type)

When the current in the primary coil (vector potential solenoid coil 4A(4)) is varied with time, a voltage that is the differential of the primary current is generated in the secondary conductor 7 (straight conductor), regardless of there being no magnetic field within the internal space of the vector potential solenoid coil 4A(4). This coincided well with the theory.

When a measurement was made with the secondary conductor 7 made to be a coil (secondary coil) in place of a straight conductor in order to verify that there was no magnetic field in the internal space X1 of the vector potential solenoid coil 4A(4), substantially the same voltage was observed as in the case of a straight conductor. Additionally, this was substantially the same even if the secondary coil winding direction was reversed, A direct current was passed through the vector potential solenoid coil 4A(4), and the magnetic field in the internal space of the vector potential solenoid coil 4A(4) was measured using a Hall sensor. When a 2-A current was passed through the vector potential solenoid coil, a magnetic field of at least over 1 μT, which is the sensitivity range of the Hall sensor, was not observed. From this, it was verified that, in the case of a return current, there is almost no magnetic field in the internal space of the vector potential solenoid coil. In contrast, if there is no return current, it was verified that a magnetic field of several hundred μT is generated.

As far as the inventors know, there has been no case in which a vector potential generation device 1A(1) such as this has been fabricated and a signal has actually been detected. That is, the present invention is extremely novel and also has great ramifications. And the phenomenon is not inconsistent with electromagnetic theory.

Second Embodiment

The Case of a Donut-Shaped Base Body with a Central Void

Figure 13:
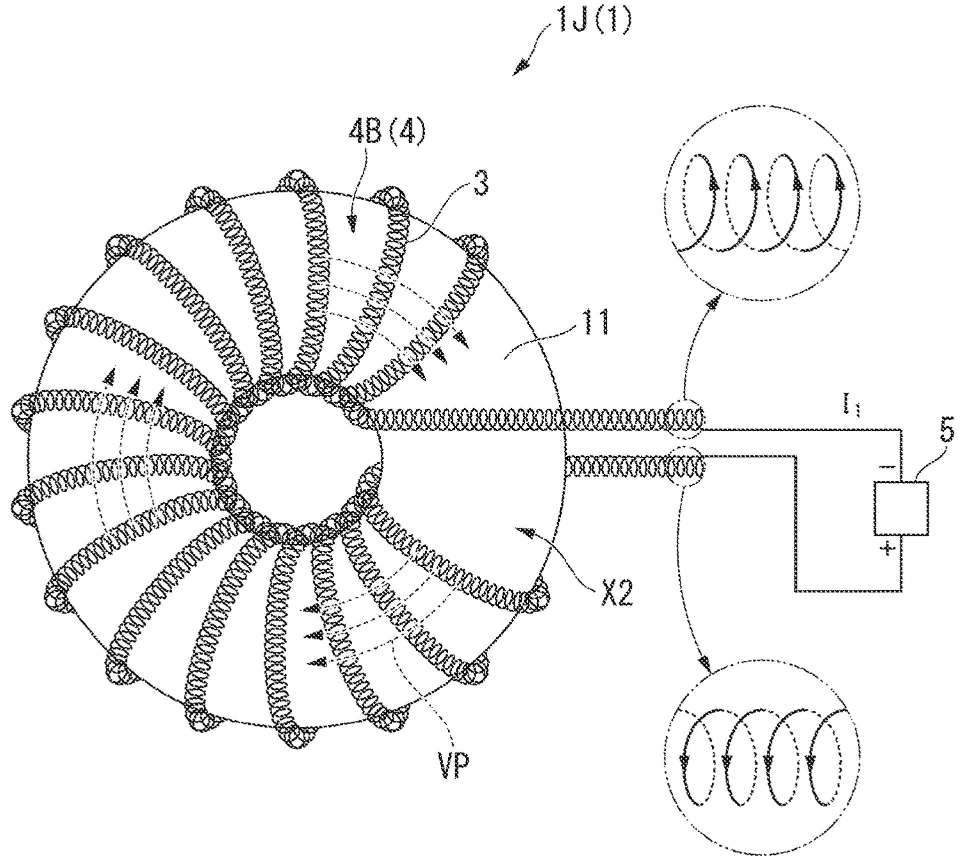
FIG. 13 shows an example of a vector potential generation device according to a second embodiment.

FIG. 13 shows, in schematic form, an example of the constitution of a vector potential generation device according to the second embodiment.

The description to follow focuses on the parts that are different from the first embodiment, with descriptions of common parts being omitted.

(2-1) Basic Structure

Although in the vector potential generation device of the first embodiment the base body was cylindrical, a feature of the vector potential generation device of the second embodiment is that the base body is donut-shaped.

The vector potential generation device 1J(1) shown in FIG. 13 includes a vector potential coil 4 formed by a solenoid coil 3 formed by a wound conductor 2, wound circularly around a base body 11, of which at least the part in contact with the solenoid coil 3 has an insulating property, and a power supply 5 electrically connected between two terminals of the vector potential coil 4. The power supply 5 may be either direct current or alternating current.

Although the description that follows is premised on the direction of winding of the helix of the conductor 2 being "left-winding," as shown in FIG. 13, even for the reverse direction (right-winding), the operating mechanism and effect of the present invention are achieved (although the vector potential to be generated (indicated by the dotted line arrows) will be in the reverse direction).

In the vector potential generation device 1J(1), passing a current through the vector potential coil 4, places the internal space X2 formed by the winding structure of the vector potential coil 4B(4) into a substantially non-magnetic field state, and generates a vector potential within the internal space X2.

In the cylindrical vector potential solenoid coil 4, there is a concern about the vector potential gauge effect at the coil end parts. The electric field is not uniform, being strong at the central part of the coil and weak at the end parts thereof. Given this, in the second embodiment, a donut-shaped base body 11 is used to constitute the vector potential coil 4B(4) having a circulating toroidal structure. In this case, the donut-shaped vector potential coil of the second embodiment will be referred to as a vector potential toroidal coil 4B(4).

By using a donut-shaped base body 11 that does not have end parts, it is possible to reduce the vector potential end effect at the base body ends and the influence of non-uniformity of the electric field.

When the solenoid coil 3 is wound around the donut-shaped base body 11 that serves as the core of toroid, it is necessary to consider the winding direction. This is because the return current, which will be described later, generates a vector potential of one turn in the toroidal direction. If the vector potential AF made on the outside of a long solenoid coil 3 and the vector potential AR made by the return current, to be described later, are made to be in opposite directions, there secondary elements can be removed.

(2-2) With Return Current

Even in the vector potential generation device of the second embodiment having a toroidal structure having a conductor is placed so as to contact the solenoid coil 3, a return current conductor 6 may be further provided, which returns a current that is substantially the same current as that flowing in the vector potential toroidal coil 4B(4) but in the opposite direction.

By further having the return current conductor 6 and by returning a current that is equal to and in the opposite direction from the current flowing in the vector potential toroidal coil 4B(4), it is possible to cancel out the parasitic magnetic field generated in the overall coil and to obtain a pure vector potential.

Figure 14:
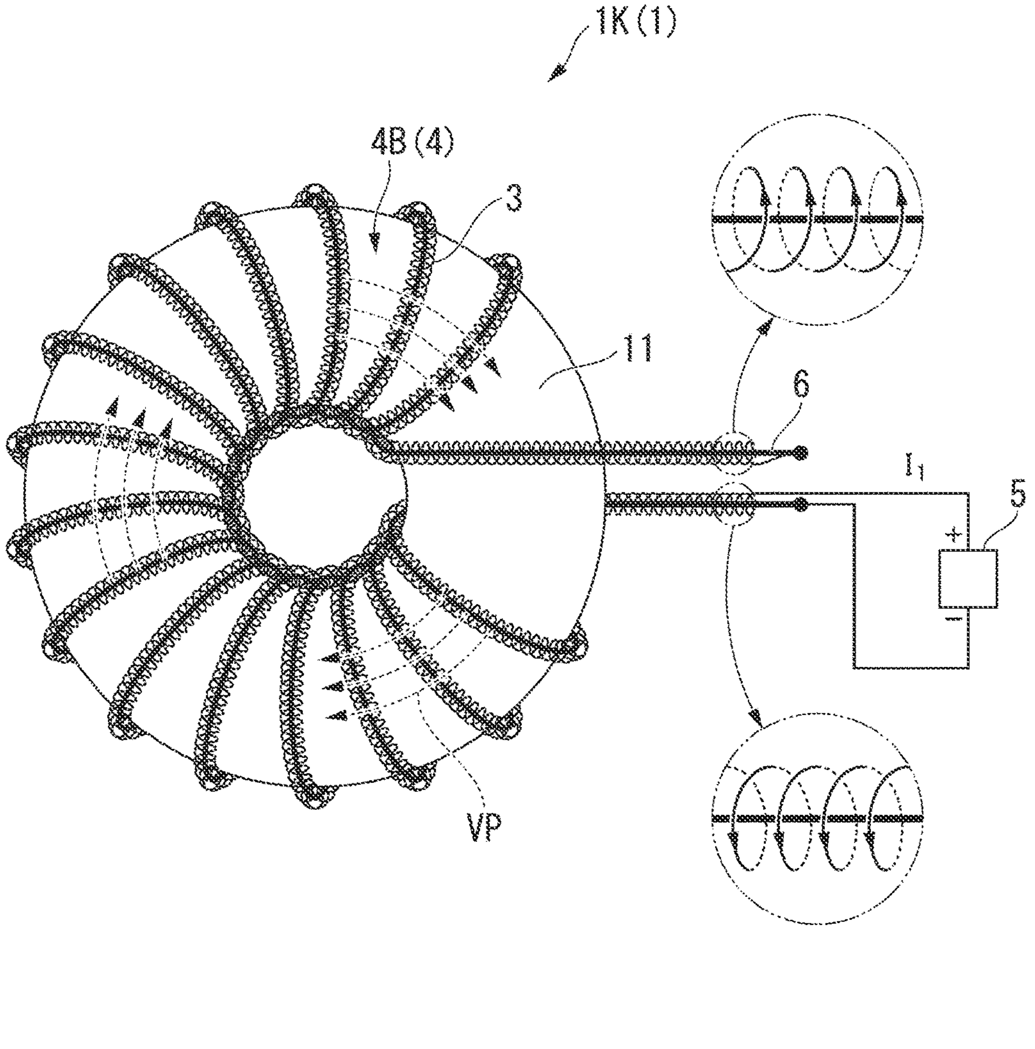
FIG. 14 shows another example of the generation device shown in FIG. 11

The return current conductor 6 may be placed so as to pass through the internal space formed by the winding structure of the solenoid coil 3, such as in the vector potential generation device 1K(1) shown in FIG. 14. The return current conductor 6 may be placed by winding in parallel with the solenoid coil 3 so that it is in the same direction as the winding direction of the solenoid coil 3.

The effect of the return current conductor 6 is placed in the internal space of the solenoid coil 3 will now be described.

Assume a fixed primary current of 1.33 $A_{PP}$ and frequency f of 10 kHz.

With a secondary coil is placed in the internal space of the base body 11, the voltage induced in the secondary coil was 2.11 V in the case of the solenoid coil 3 only, without the return current conductor 6, was −0.32 V with the return current conductor 6 only, and was 1.80 V with the solenoid coil 3 having the return current conductor 6. In the cases having the return current coil 6, the negative sign on the voltage means that the voltage had a relatively reversed phase.

In the case of no return current conductor 6, in addition to the vector potential by the outside of the solenoid coil 3, there is an overlapping magnetic field component created by the current flowing overall in the one turn in the toroidal direction. By providing the return current conductor 6, this magnetic field component of the single-turn coil can be removed. The return current, by the rotation of the overall current in the poloidal direction, can cancel the magnetic field generated inside the toroidal cylinder as well. Even if a magnetic field is generated, because the magnetic flux and the secondary coil conductor are parallel, no voltage is generated by electromagnetic induction. In the case of an arbitrarily shaped secondary coil, however, a voltage could be generated, making the provision of the return current conductor important.

Although usually a coil is almost always made with winding a single conductor, in a three-dimensional space, the coil is wound in the direction of flow of current, while twisting it a small amount each time. As a result, because current is conserved, it is necessary to consider the poloidal direction, which is the superordinate structure of the spiral, which is the subordinate structure, and further the magnetic field or vector potential by the flow of current in the global winding in the toroidal direction, which is a further superordinate structure. The return current conductor 6 is necessary to eliminate the effect of the magnetic field and use only the effect of the vector potential.

(2-3) With a Second Conductor (Vector Potential Transformer)

Figure 15:
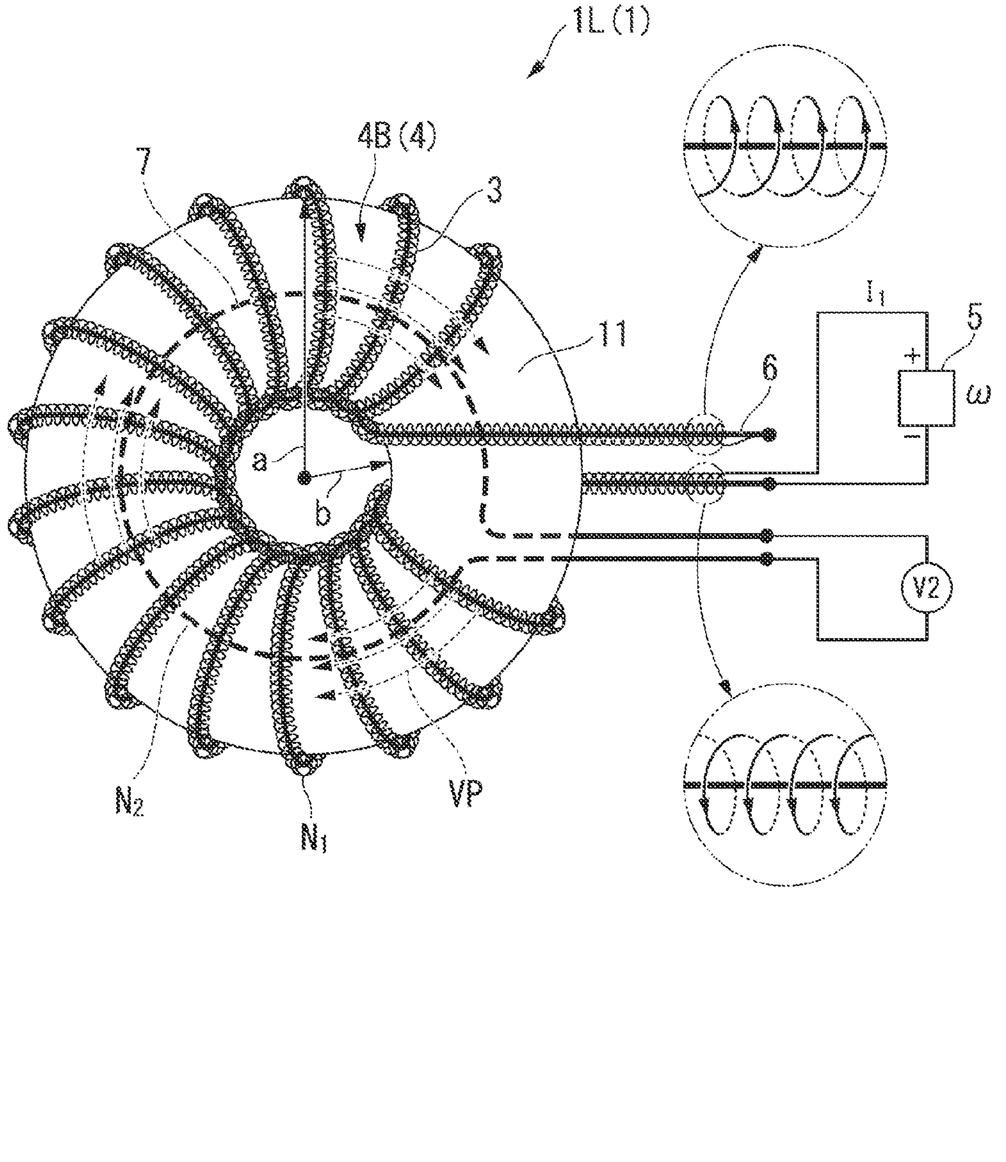
FIG. 15 shows another example of the generation device shown in FIG. 11.

FIG. 15 shows, in schematic form, another example of the constitution of the vector potential generation device 1.

The vector potential generation device 1L(1) has a vector potential toroidal coil 9 and a secondary conductor 7 placed inside the donut-shaped base body 11, the two ends of the secondary conductor 7 leading out from substantially the same location of the base body 11.

First, the magnetic field in the internal space of a usual toroidal coil is given by the following equation.

Equation 13

$$H = \frac{N_1 I}{4\pi}\left(\frac{1}{a} + \frac{1}{b}\right) \tag{13}$$

In the above, $N_1$ is the number of primary turns in the toroidal coil, I is the toroidal coil primary current, a is the inner radius of the toroid, and b is the outer radius of the toroid. Note that H is the average magnetic field at the average radius, assuming that (b−a)<<a.

Similar to a solenoid coil, E corresponds to A, and I corresponds to Φ.

Equation 14

$$A = \frac{N_1 \mu_0 n S}{4\pi}\left(\frac{1}{a} + \frac{1}{b}\right) I_m \sin(\omega t) \tag{14}$$

The electric field E inside the donut tube of the toroidal coil is given by the time differential of the vector potential.

Equation 15

$$E = -\frac{\partial A}{\partial t} = -\frac{N_1 \mu_0 n S}{4\pi}\left(\frac{1}{a} + \frac{1}{b}\right)\omega I_m \cos(wt) \tag{15}$$

The voltage $V_2$ induced in the secondary coil (second conductor 7) can be determined by integrating the electric field E along the secondary coil.

Equation 16

$$V_2 = -N_2 \int_L E \cdot dr \tag{16}$$

In the above, the assumption is that a secondary coil is placed, in which the number of turns by $N_2$ at the average radius position of (b−a)/2.

The secondary voltage $V_2$ is given by the following equation.

Equation 17

$$V_2 = \frac{N_1 N_2 n \mu_0 S (a+b)^2 \omega I_m \cos(\omega t)}{4ab} \quad (17)$$

Experimental Example 2

With a current of $\omega=6.283\times10^4$ rad/s and $I_m=1.33\ A_{PP}$ input to a transformer of $N_1=48$ turns, $N_2=59$ turns, n=710 turns/m, $S=7.07\times10^{-6}\ m^2$, a=0.035 m, and b=0.085 m, a voltage of $V_2=1.80\ V_{PP}$ was measured. This value of coincided well with the theoretical value of 1.84 $V_{PP}$.

In this manner, even in the case of a toroidal structure, it is possible to constitute a vector potential transformer using the vector potential generation device 1L(1) shown in FIG. 15.

Figure 16:
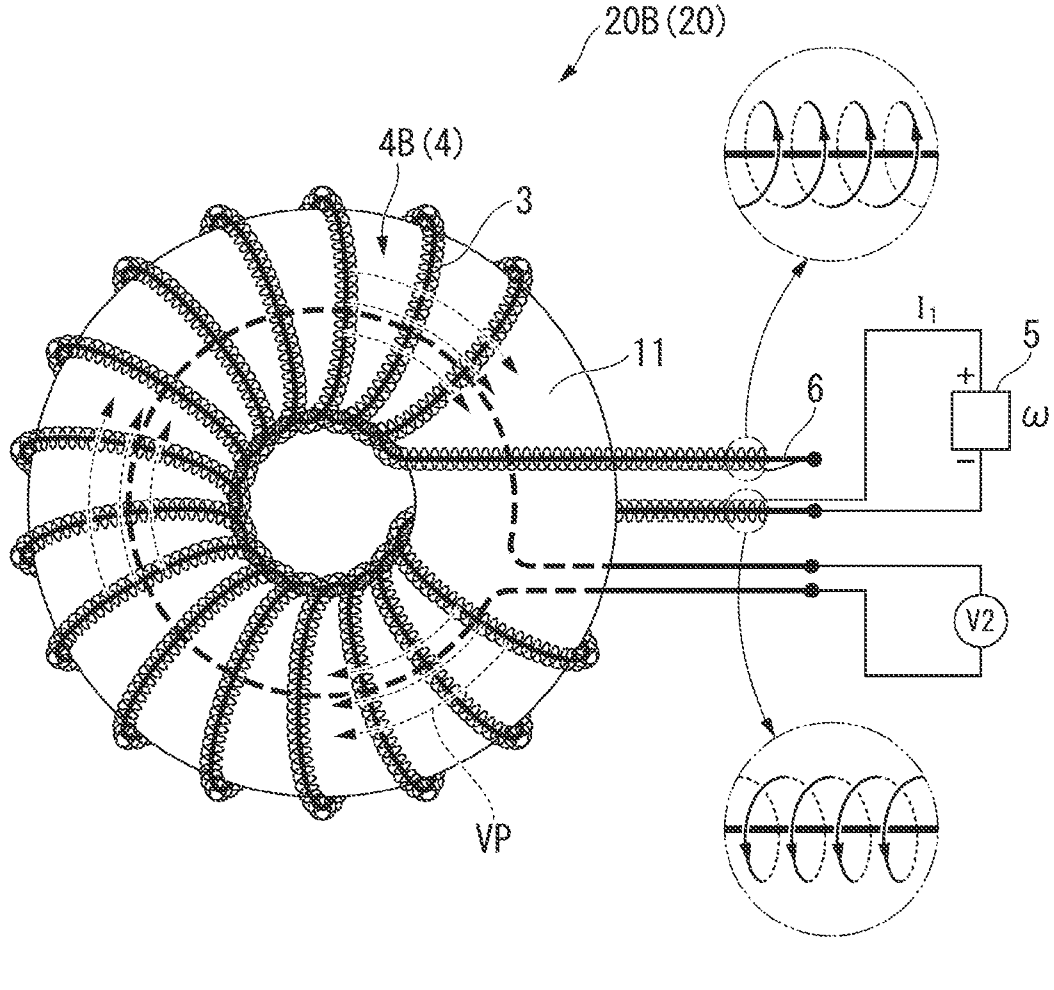
FIG. 16 shows an example of a vector potential transformer according to the second embodiment.

That is, a vector potential transformer 20B(20) (vector potential toroidal transformer) of the present invention, as shown in FIG. 16, has a vector potential solenoid coil 4B(4) and, a secondary conductor 7 placed in parallel with the toroidal direction inside a donut-shaped base body 11.

According to the present invention, it is possible to implement a transformer that does not generate a magnetic field. Such a vector potential transformer 20B(20) that does not generate a magnetic field is effective in medical and high-precision measurements.

Third Embodiment

Sheet-Like Base Body

Figure 17:
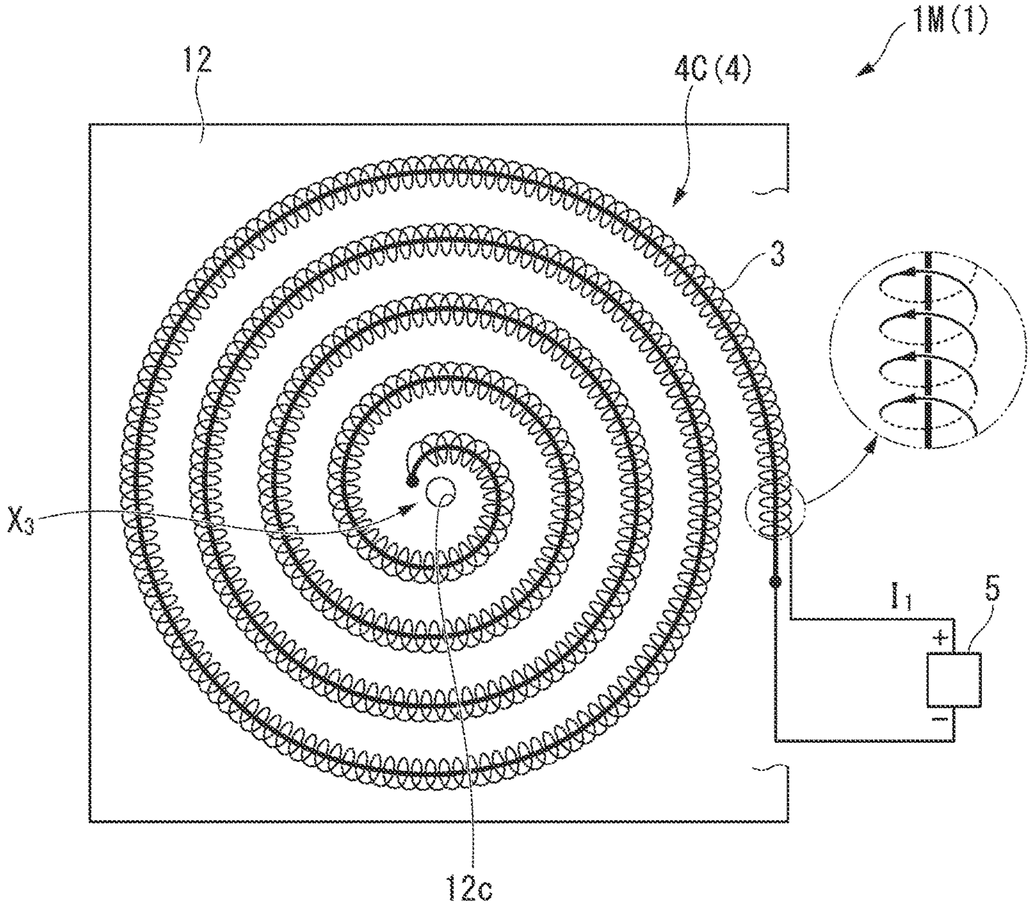
FIG. 17 shows an example of a vector potential generation device according to a third embodiment.

FIG. 17 shows, in schematic form, another example of the constitution of a vector potential generation device according to the third embodiment.

In the vector potential generation devices of the first and second embodiments, the structure is one in which the solenoid coil is wound three-dimensionally onto a three-dimensional base body.

A feature of the vector potential generation device 1M(1) of the third embodiment is that of having a sheet-like base body. In the vector potential generation device of the third embodiment, the solenoid coil is spirally placed on a sheet-like base body 12 in two dimensions. The vector potential coil of the third embodiment, which forms a spiral, will be referred to as the vector potential spiral coil 4C(4).

The vector potential generation device 1M(1) includes a vector potential spiral coil 4C(4) formed by a solenoid coil 3 formed by a wound conductor 2 wound circularly around the base body 12, of which at least the part in contact with the solenoid coil 3 has an insulating property, and a power supply 5 electrically connected between two terminals of the vector potential coil 4C(4).

In the vector potential generation device 1M(1), passing a current through the vector potential spiral coil 4C(4) places the internal space X3 formed by the winding structure of the vector potential spiral coil 4C(4) into a substantially non-magnetic field state, and generates a vector potential within the internal space X3.

The vector potential generation device 1M(1) of the third embodiment having a spiral structure also may further have a return current conductor 6 made of a conductor is placed in contact with the solenoid coil 3 and returning a current that is substantially the same as the current flowing in the vector potential coil and in the opposite direction thereto.

By further providing the return current conductor 6 and by returning a current that is substantially the same as, and in a direction opposite to, the current flowing in the vector potential coil, it is possible to cancel out the current in the overall coil and obtain a more stable vector potential.

By having the return current conductor 6, it is possible to dispose the input terminal and the output terminal of the coil at the outside of the spiral, thereby eliminating the need to lead to a terminal from the center of the spiral.

The return current conductor 6 may be placed so as to pass through the internal space formed by the winding structure of the solenoid coil 3, for example as shown in FIG. 6. The return current conductor 6 may be placed to be coaxial with the solenoid coil 3 and wound in a direction that is opposite to the winding direction of the solenoid coil 3.

In the case of constituting a transformer, regardless of manner in which the secondary conductor arranged on one side at the front side or at the rear side of the base body, a voltage is not generated. If a hole 12*c* is provided in the base body 12 at the central part of the spiral and the secondary conductor is passed from the front side of the base body to the rear side or in the reverse direction, a voltage is generated.

Fourth Embodiment

Case of the Base Body being a Sphere with a Central Void

In the above-described first to third embodiments, the descriptions have been for examples of a vector potential coil as a vector potential generation device in which a solenoid coil is wound around base bodies that are tubular, donut-shaped, and sheet-like. The present invention is not restricted to these examples, and can use, for example, a sphere with a central void as the shape of the base body.

Figure 18:
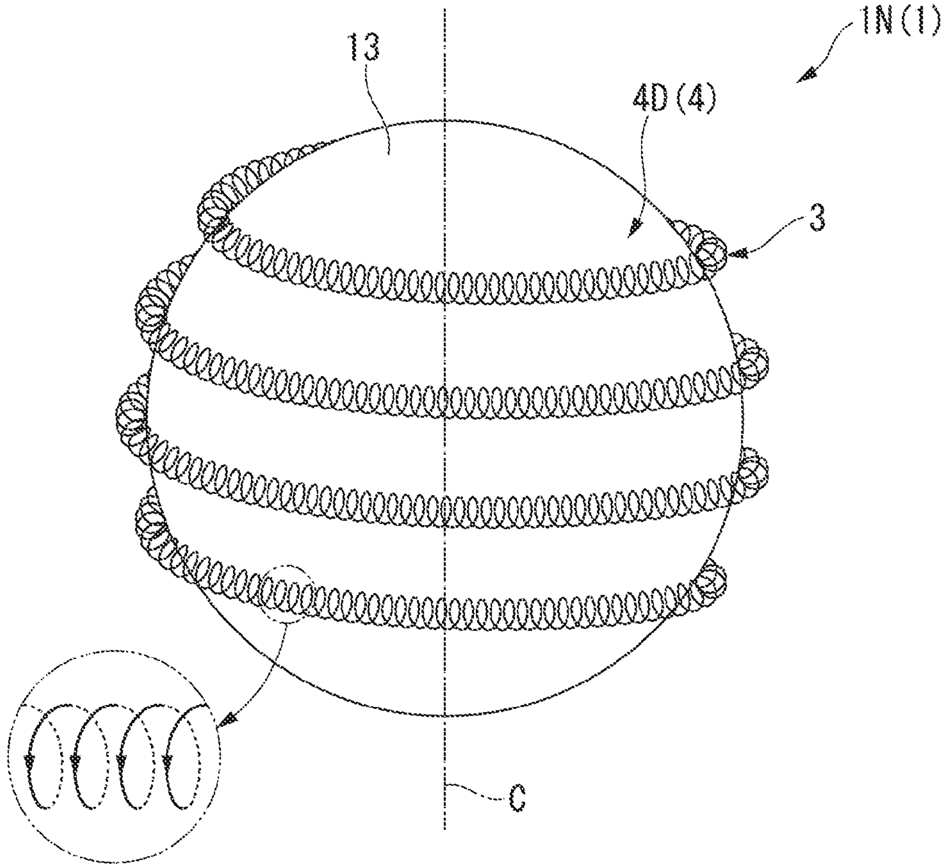
FIG. 18 shows an example of a vector potential generation device according to a fourth embodiment.

FIG. 18 shows, in schematic form, an example of the constitution of a vector potential generation device according to the fourth embodiment. As shown in FIG. 18, in the vector potential coil 4D of the fourth embodiment (also referred as the vector potential spherical coil), by forming the vector potential coil by winding a solenoid coil onto a base body that is a sphere with a central void, it is possible to generate a vector potential in the internal space of the base body that has a more uniform width (thickness) than the case of a cylindrical base body. The shape of the base body or the vector potential coil may be spherical or polyhedral.

Non-Contact Space Electric Field Generation Device

A non-contact space electric field generation device of an aspect of the present invention has a vector potential generation device of the first embodiment.

The non-contact space electric field generation device has the cylindrical vector potential solenoid coil 4A(4) such as shown in FIG. 9. By passing an alternating current through the vector potential coil 4, an electric field proportional to the time differential of the alternating current and having a direction parallel to the axis of the vector potential solenoid coil 4A(4) can be generated in the internal space of the solenoid coil.

In the solenoid type vector potential coil 4A(4), when each of the terminals of the secondary conductor 7 (secondary coil) leads out from different sides of the opening part of the vector potential solenoid coil 4A(4), a voltage V2 proportional to the time differential of the solenoid coil (primary coil) is generated in the secondary conductor.

In this non-contact space electric field generation device, if there is an electrically conductive medium, an electric field can be generated in a straight line, without contact. For this reason, the non-contact space electric field generation device can be used in applications that include particle accelerators, and also practical applications, such a plasma propulsion engines and seawater pumps that have absolutely no mechanical parts.

For example, if the vector potential solenoid coil 4A(4) is immersed in seawater, current flows in a direction that cancels the change in vector potential in the seawater in the central void of the cylinder. Because this current is an ion current, force acts on the seawaters.

Null Circuit

Figure 19:
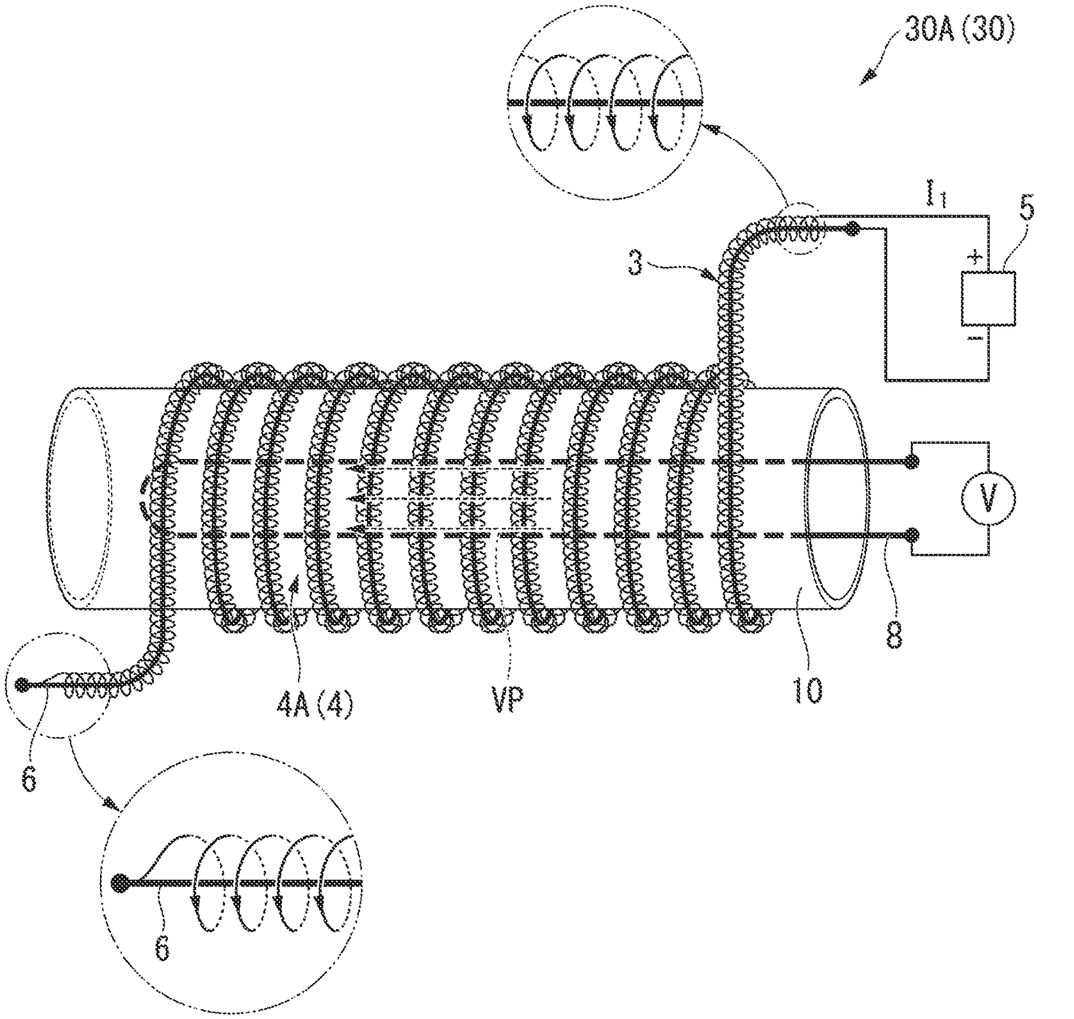
FIG. 19 shows an example of a null circuit.

FIG. 19 shows, in schematic form, an example of the constitution of a null circuit of an aspect of the present invention.

The null circuit 30 of the present invention has the vector potential generation device 1H(1) such as shown in FIG. 9 and a secondary conductor 8 placed in the internal space of the cylindrical base body 2. The input and output terminals of the secondary conductor 8 both lead out from the same side end part of the base body 10.

The null circuit 30 has a cylindrical vector potential solenoid coil 4A(4) such as shown in FIG. 9. By passing an alternating current through the vector potential solenoid coil 4A(4), the voltage V across the two terminals of the secondary conductor 8 is canceled to zero volt, with dependency on neither a signal applied to the vector potential solenoid coil 4A(4) nor the manner in which the secondary conductor 8 is arranged within the cylinder.

In the cylindrical vector potential solenoid coil 4A(4), if the terminals of the coil (secondary coil) go into and out from the same side of the internal space of the cylindrical base body, a signal is not detected. That is, if the conductor makes a round trip within the cylinder, the signal is canceled. The signal is not detected outside the cylinder.

In the cylindrical vector potential solenoid coil 4A(4), if both terminals of the secondary conductor 8 are taken out at one side of the opening of the vector potential solenoid coil 4A(4), the voltage induced in the secondary conductor 8 is canceled by the round trip, and is not influenced by the current flowing in the primary side solenoid coil.

For example, even if a conductor having an arbitrary shape is placed within the central void of the cylinder of the vector potential solenoid coil 4A(4), as long as all input and output terminals enter and exit from the same side, there is no influence.

In contrast, as described above, if each of the terminals of the secondary conductor are taken out at different sides of the opening of the vector potential solenoid coil 4, a voltage proportional to the time differential of the primary coil is generated in the secondary conductor (vector potential solenoid transform).

Regardless of how the secondary coil is arranged in the same plane and in the space on that same plane of the spiral, the voltage is zero. A voltage is generated only in the case of passing through the opposite side plane. That is, feed of electricity is possible only when straddling the layers.

Superconductivity

Figure 20:
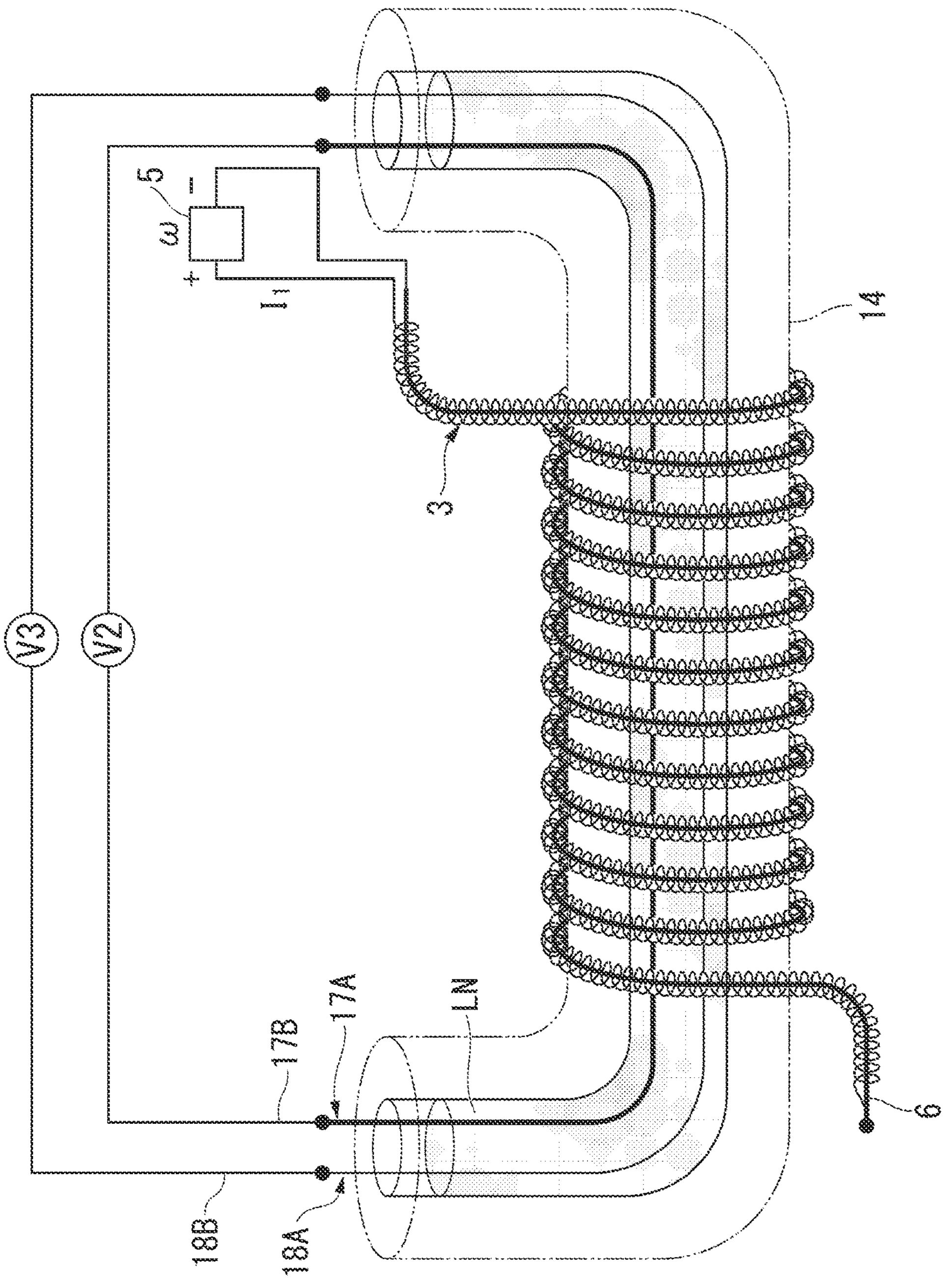
FIG. 20 shows an example of a constitution using superconducting wire in the secondary coil.

FIG. 20 shows, in schematic form, an example of the constitution using a superconducting wire for the secondary coil. The secondary coil 17A is a bismuth-based high-temperature superconducting wire, and is constituted to be cooled and maintained at a temperature of 77K by liquid nitrogen LN. In order to suppress evaporation of the liquid nitrogen LN, a U-shaped heat-insulating container 14 having a cylindrical structure with a central void is used. Of the superconducting wire 17A that serves as the secondary conductor, the part that is immersed in the liquid nitrogen is in the superconducting state, and the part that is not immersed in the liquid nitrogen and is exposed outside thereof above the critical temperature is in the normally conducting state. The outer skin of the superconducting wire 17A is covered by a silver alloy (silver conductor), and both ends of the superconducting wire 17A are electrically connected to the voltmeter V2 by copper lead wires 17B.

Because the primary side vector potential coil is provided in a partial region (referring to the overlapped region in FIG. 20) of the secondary coil that is in the superconducting state, the secondary coil of the part to which the vector potential coil is applied is in the superconducting state.

Figure 22A:
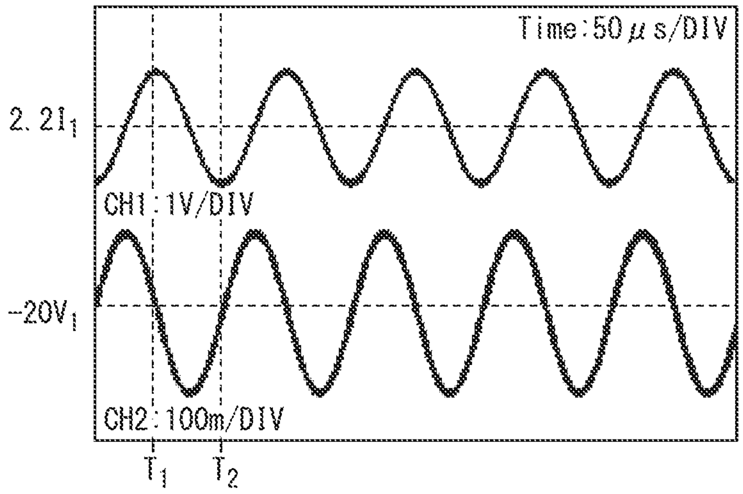
FIG. 22A is a graph showing the input-output characteristics of a vector potential transformer.
Figure 22B:
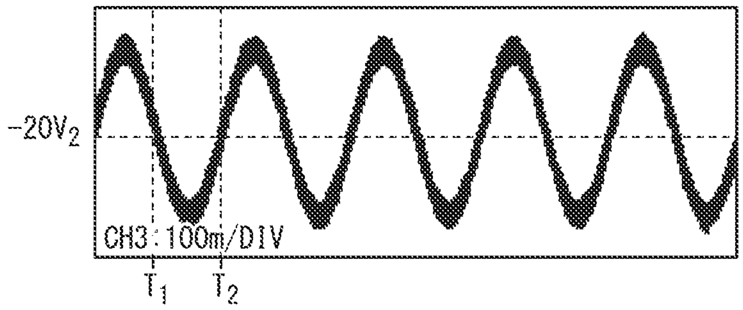
FIG. 22B is a graph showing the input-output characteristics of a vector potential transformer.
Figure 22C:
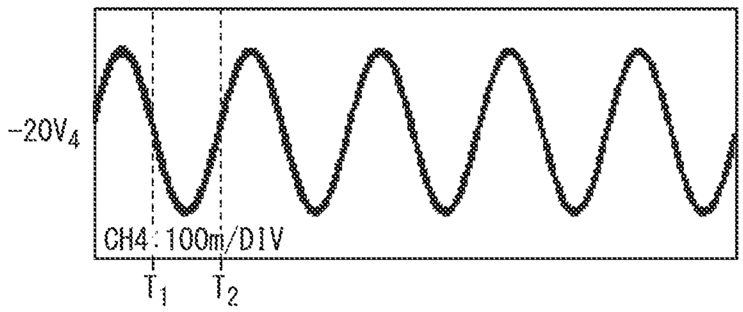
FIG. 22C is a graph showing the input-output characteristics of a vector potential transformer.

With a disposition such as this, if an alternating primary current $I_1$ from the alternating current power supply 5 is passed through the vector potential coil 3 (refer to the graph at the upper of FIG. 22A), a secondary voltage is generated in the secondary coil in proportion to the differential waveform of the primary current (refer to the graph at the lower part of FIG. 22A). Because there is absolutely no magnetic field in the space inside the vector potential coil provided with a return current path, a secondary voltage is generated, regardless of the secondary side superconducting wire being not exposed to a magnetic field (FIG. 22B and FIG. 22C). The times T1 and T2 in FIG. 22A correspond to the times T1 and T2 in FIG. 22B and FIG. 22C. Thoughts regarding these graphs will be presented later.

From the above-described relationship between the primary current and the secondary voltage, even if a voltage were to be induced in the silver conductor that forms the outer skin, because it is integrated in parallel with the superconducting wire, the idea that there is shortening and a voltage is not generated is in error, and it is clear that if an alternating current vector potential coil is applied, a voltage would be generated at the two ends.

The normally conducting wire 18A shown in FIG. 20 is a copper wire as a reference, provided in the liquid nitrogen together with the high-temperature superconducting wire 17A. Although copper in the liquid nitrogen is normally conductive, it is provided for the purpose of comparison under the same conditions as the high-temperature superconducting wire. The lead wire 18B is a lead wire for the purpose of connecting to the voltmeter V3 to the reference normally conductive wire 18A. The same voltage is observed at the superconducting wire 17A and the normally conducting wire 18A. More specifically, between the superconducting wire 17A and the normally conducting wire 18A a voltage (V2=V3) is observed in which the peak positions and the points of inflection along the time axis mutually coincide.

For example, if a 1-kHz current of 2.97 A is passed through the primary coil and the alternating current voltage on the secondary side is measured, the open-circuit voltage was 7.21 mV, which is the same as on the superconducting wire.

Because the vector potential is permeable, it is not necessary that the heat-insulating container 14 be non-conductive or non-magnetic.

Additionally, although the vector potential coil on the primary side uses a normally conducting wire of copper at room temperature, it may be a superconducting coil.

Although a high-temperature superconductor using liquid nitrogen has been used in the present embodiment, if niobium-based low-temperature superconductor cooled by liquid helium or a freezer is used in place of the high-temperature superconductor, bending is facilitated. That being the case, the primary-side vector potential coil can also be made of a superconductor, thereby greatly improving the Joule heat and frequency response of a long wire.

Multiwire Coil

A vector potential coil has a drawback that, the length of the solenoidal outer circumferential conductor becomes extremely long relative to the central conducting wire, resulting in an increased electrical resistance. Although, as described above, this drawback is solved by using a superconducting conductor, even with a normally conductive conductor, a reduction of the resistance can be made by making a compound conductor using a multiwire coil such as shown in FIG. 21A and FIG. 21B.

Figure 21A:
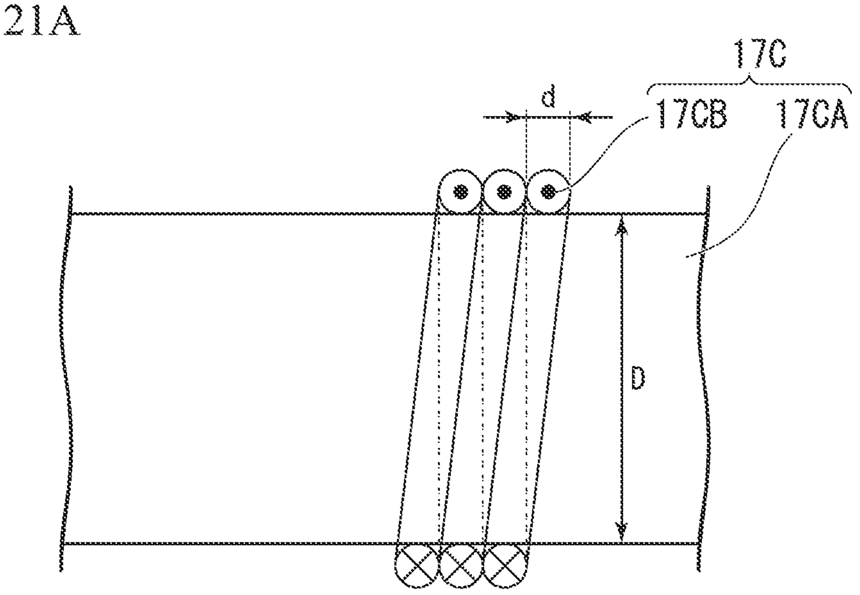
FIG. 21A shows an example of a constitution using a multiwire coil in the secondary coil.
Figure 21B:
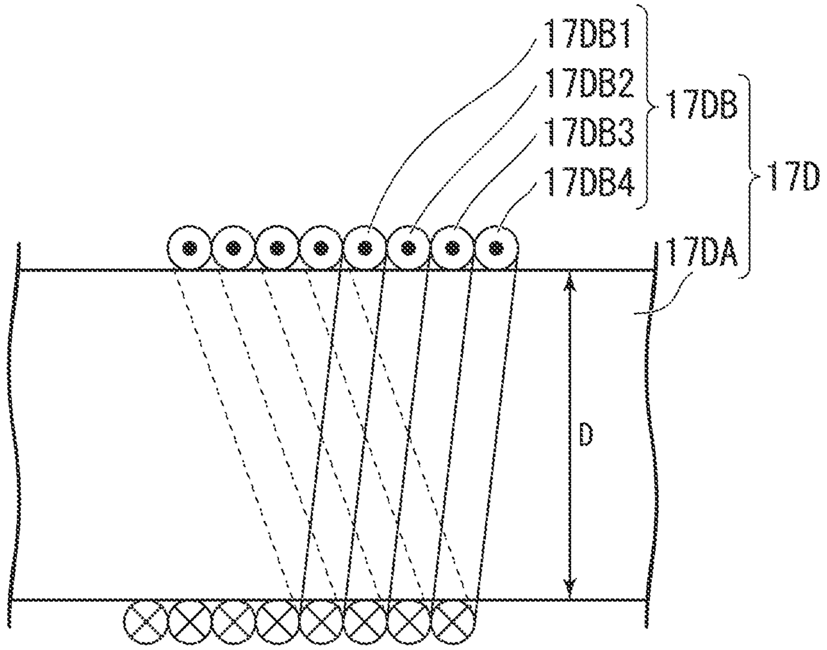
FIG. 21B shows an example of a constitution using a multiwire coil in the secondary coil.

FIG. 21A and FIG. 21B show, in schematic form, the cases of a "single-wire coil" and a "four-wires coil," which forms a compound conductor, respectively. In FIG. 21A, 17CA is the center conductor, 17CB is the outer circumferential conductor, and 17C is the vector potential coil. In FIG. 21B, 17DA is the center conductor, 17DB1 to 17DB4 (17DB) are outer circumferential conductors, and 17D is the vector potential coil. The D and d noted in FIGS. 21A and 21B are described in detail in the section "Various Actual Vector Potential Coil Measurement Results."

In order to gain an understanding of the phenomenon, the simplifications of the current distribution in a conductor being uniform and the coil twisting effect being negligible will be used.

That is, if we assume that the outer circumferential conductor makes one turn around the center conductor in intimate contact therewith, the center conductor resistance $R_1$ and the outer circumferential conductor resistance $R_2$ satisfy the relationships of Equation (18) and Equation (19). In this case, D is the diameter of the center conductor serving as the return current conductor, d is the diameter of the outer circumferential conductor of the solenoidal coil on the outside, and p is the resistivity of the solenoid coil on the outside.

Equation 18

$$R_1=4\rho d/\pi D^2 \tag{18}$$

Equation 19

$$R_2=4\rho(D+d)/d^2 \tag{19}$$

Because the outer circumferential conductor is longer than the center conductor, $R_1<R_2$, and if we define that ratio as η, η is expressed by Equation (20).

Equation 20

$$\eta=R_2/R_1=\pi D^2(D+d)/d^3 \tag{20}$$

Additionally, if we assume D>>d and D/d=m, Equation (20) is approximated by Equation (21).

Equation 21

$$\eta\approx\pi m^3 \tag{21}$$

In this manner, because the resistance $R_2$ of the outer circumferential conductor increases when the diameter d of the outer circumferential conductor of the outside solenoid-type coil becomes small, the outer circumferential conductors are made parallel and wound onto the center conductor.

For example, if M conductors are connected in parallel to make a compound conductor, the resistance is reduced to 1/M, and the requirement for a high-voltage power supply is greatly alleviated. FIG. 21B corresponds to the case in which M=4.

Various Actual Vector Potential Coil Measurement Results

FIG. 22A is a graph showing the input-output characteristics of a solenoid-type (straight-shape type) vector potential transformer. In FIG. 22A, the upper waveform is the primary current waveform (1 $A_{PP}$) and the lower waveform is the secondary coil (straight conductor) open-circuit voltage, observed using a −20× amplifier. From FIG. 22A, it can be verified that the secondary coil open-circuit voltage is the differential waveform of the primary current.

FIG. 22B is a graph showing the open-circuit voltage for the case of a solenoid coil used as the secondary coil. Although because the secondary coil becomes long and the resistance increases, there is superimposed white noise, it can be seen that there is no change in the amplitude of the signal response. That is, from FIG. 22B, it can be verified that there is no magnetic field inside the internal space of the vector potential coil and that induction into the secondary coil is the vector potential.

FIG. 22C is the output voltage of the secondary coil for the case of electromagnetic shielding of a straight secondary coil by a hollow brass pipe. With the conductivity of brass, with respect to a 10-kHz electromagnetic wave, the skin depth is 1.23 mm, and it can be seen that a signal passes through brass having a thickness of 10 mm. Regarding this phenomenon of a vector potential passing and being propagated through a metal, it was verified that there was a transmission without any attenuation, not only through aluminum or stainless steel, which are nonmagnetic, but also through a steel tube, which is magnetic.

Figure 25:
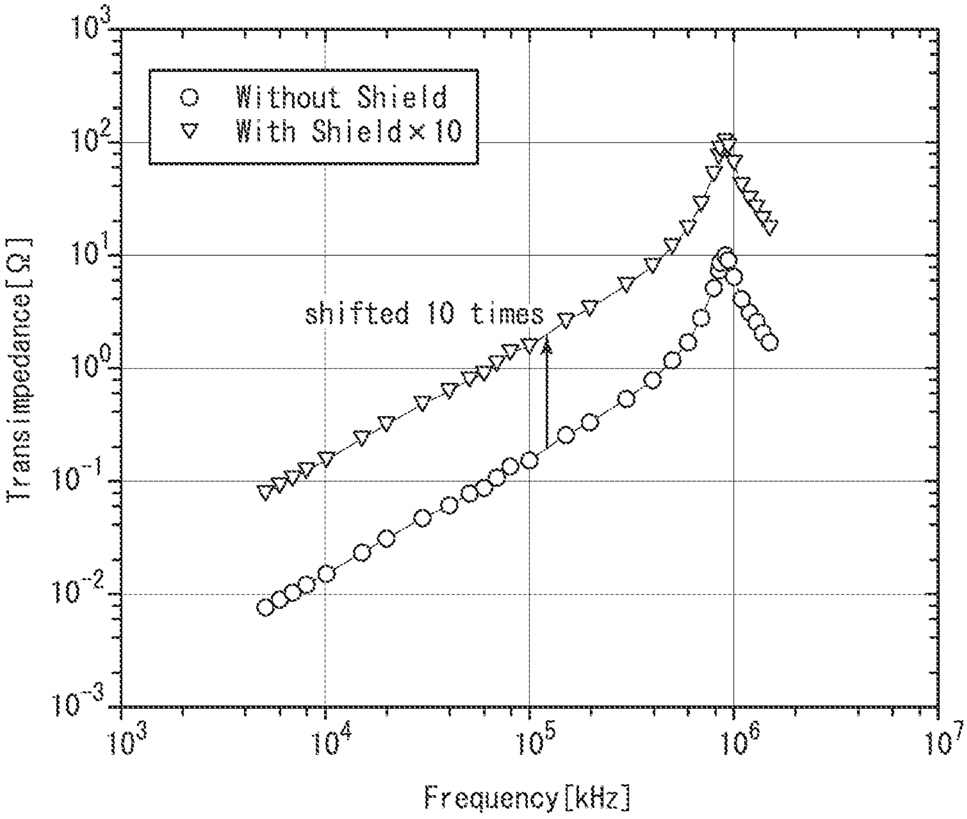
FIG. 25 is a graph showing the frequency characteristics of the trans-impedance (second voltage/primary current).

FIG. 25 shows the experimental results for the transimpedance (secondary voltage/primary current) frequency characteristics in the case of with and without a brass shield. The circular marks indicate the case of no shield, and the inverted triangle marks indicate the case of having a shield. In order to make the plot easier to read, the values at the latter (inverted triangle marks) are multiplied by 10 to shift their positions. In reality, the circular marks and inverted triangle marks virtually coincide, and there is overlapping in each measured plot.

From the fact that there is coincidence in the plots even beyond the self-resonance at 900 kHz (FIG. 25), it can be verified that vector potential passes through a shield. That being the case, it has become clear that the vector potential coil according to the present invention can be utilized in non-destructive testing, non-contact communication in seawater, and non-contact electric stimulus of the deep locations in living body.

Figure 23A:
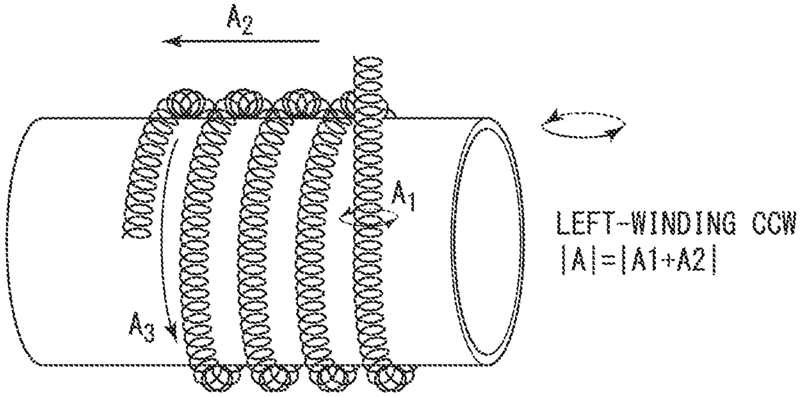
FIG. 23A is a drawing describing the winding direction and the directions of various components of vector potential.
Figure 23B:
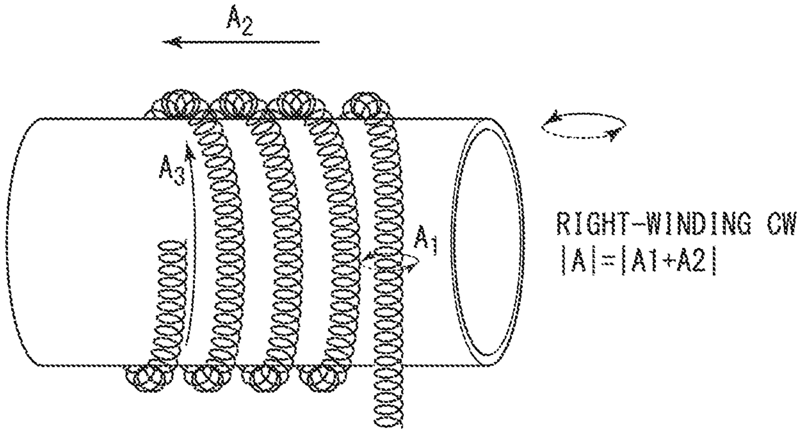
FIG. 23B is a drawing describing the winding direction and the directions of various components of vector potential.

Addition and Subtraction in Accordance with the Winding Direction, and the Effectiveness of the Return Circuit FIG. 23A and FIG. 23B describe the winding direction and the direction of various components of the vector potential. Because the vector potential uses the continuity of current, a long flexible solenoid coil is wound onto a cylinder, a toroid, a spiral, a sphere, or the like. FIG. 23A and FIG. 23B show the case of winding onto a cylinder.

By adopting such a winding constitution, the current proceeds as it rotates and further rotates, resulting in a complex mixture of vector potential components. FIG. 23A shows the case of overall left-winding (CCW) onto a cylinder, and FIG. 23B shows the case of overall right-winding (CW) onto a cylinder.

In this case, if a solenoid coil is used in which, in the finest structure of the vector potential coil, there is leftward rotation along with progression, the vector potential generated by that structure is the vector potential $A_1$. This component is generated leftward inside the cylinder in the case of FIG. 23A, and generated rightward inside the cylinder in the case of FIG. 23B.

Next, because the direction of progression of current in the overall coil is leftward for both left-winding (CCW) and right-winding (CW), the vector potential $A_2$ generated by this global current is leftward in both FIG. 23A and FIG. 23B.

Additionally, because the global current flows so as to wind around the cylinder, there is also the component $A_3$, this being in opposite directions between FIG. 23A and FIG. 23B.

In the case of providing a straight secondary conductor in the space of the cylinder, a voltage that is in proportion to the time differential of the synthesis of $A_1$ and $A_2$ is induced across the ends of the secondary conductor. In the case of FIG. 23A, because $A_1$ and $A_2$ have the same orientation, there is addition. In contrast, in the case of FIG. 23B, because they are mutually opposing in direction, there is subtraction. Regarding $A_3$, because it is perpendicular to the secondary conductor, although there is no particular contribution, magnetic flux parallel to the axis of the cylinder is generated, as in a so-called normal solenoid coil. This is simply that the vector potential is rotating. In this case, if the secondary conductor is a solenoid, a large signal is generated by normal magnetic induction.

Figure 23C:
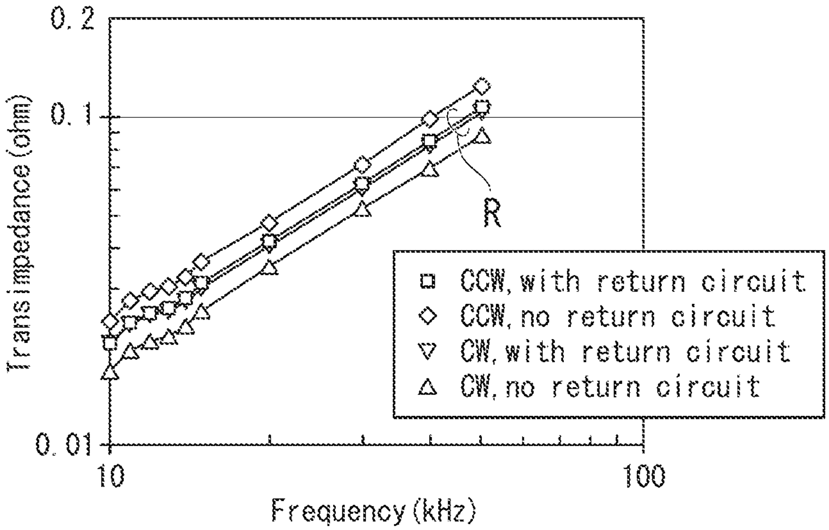
FIG. 23C is a graph showing the frequency characteristics of the transimpedance (secondary voltage/primary current).

The graph of FIG. 23C shows the experimental results of the frequency characteristics of the transimpedance (secondary voltage/primary current). Because the secondary voltage is the differential of the primary current, the transimpedance increases in proportion to the frequency.

In FIG. 23C, there are four plots, and with regard to the differences between left-winding (CCW) and right-winding (CW) onto the cylinder for the cases in which there is and is not a return current conductor (return circuit).

The rhombus plots, because $A_1$ and $A_2$ are in the same direction, add, and show the most increased secondary voltage (transimpedance).

In contrast, the triangular plots, because $A_1$ and $A_2$ are in mutually opposite directions and subtract, appear as small secondary voltages.

Additionally, in the case of the square marks and inverted triangle marks, because a return circuit conductor is provided coaxially at the center of the inside of a flexible solenoid coil (not shown), with current making a round trip over substantially the same path, vector potentials other than $A_1$ are cancelled. For this reason, no difference in amplitude appears between the left-winding (CCW) and the right-winding (CW) ($A_1$ being the opposite direction, the phase is reversed), and the two plotted marks substantially coincide. The square plots and inverted triangle plots are signals of the vector potential component that is purely $A_1$ only.

Figure 24:
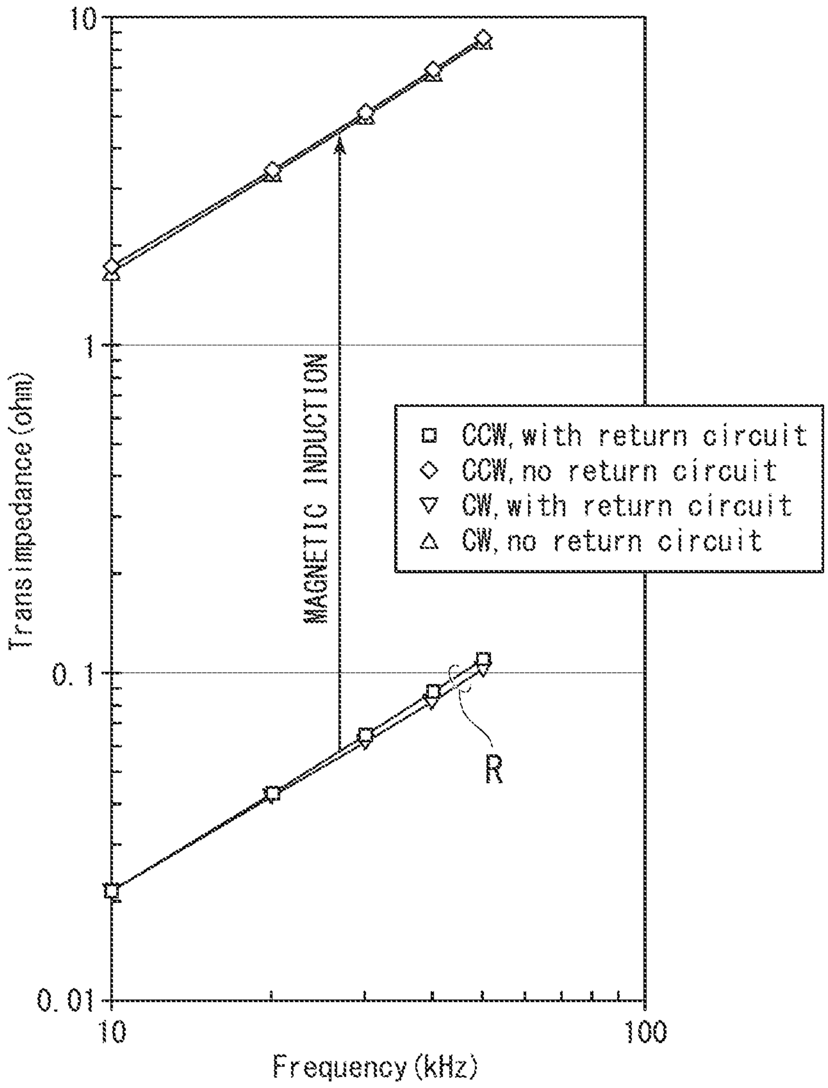
FIG. 24 is a graph showing the frequency characteristics of transimpedance (second voltage/primary current) for the case of using a solenoid coil as the secondary conductor.

The inventors investigated the case of using a solenoid coil as the secondary conductor as well, and FIG. 24 shows a graph of the experimental results.

In FIG. 24, the rhombus marks and triangular marks are plots of the case of not providing a return circuit conductor and, because a magnetic field is generated by $A_3$, a large voltage is generated in the second conductor solenoid coil. This effect is the same as the usual electromagnetic induction.

In FIG. 24, the square marks and inverted triangle marks are plots of the case of providing a return current conductor and, there being coincidence regardless of left-winding (CCW) or right-winding (CW), so that the plots coincide. Additionally, this secondary voltage coincides completely with the case of a straight conductor shown in FIG. 23C, and it was understood that the voltage induced in the secondary conductor is proportional to the inner product with the vector potential and the secondary conductor, and is not dependent on the shape of the secondary conductor.

As described above, features of the present invention are the point of providing a return circuit and the point of having a structure in which a fine solenoid coil is wound around a base body, the above-noted effect being achieved based on this constitution. This will be described in detail below, with reference made to FIG. 26.

Figure 26:
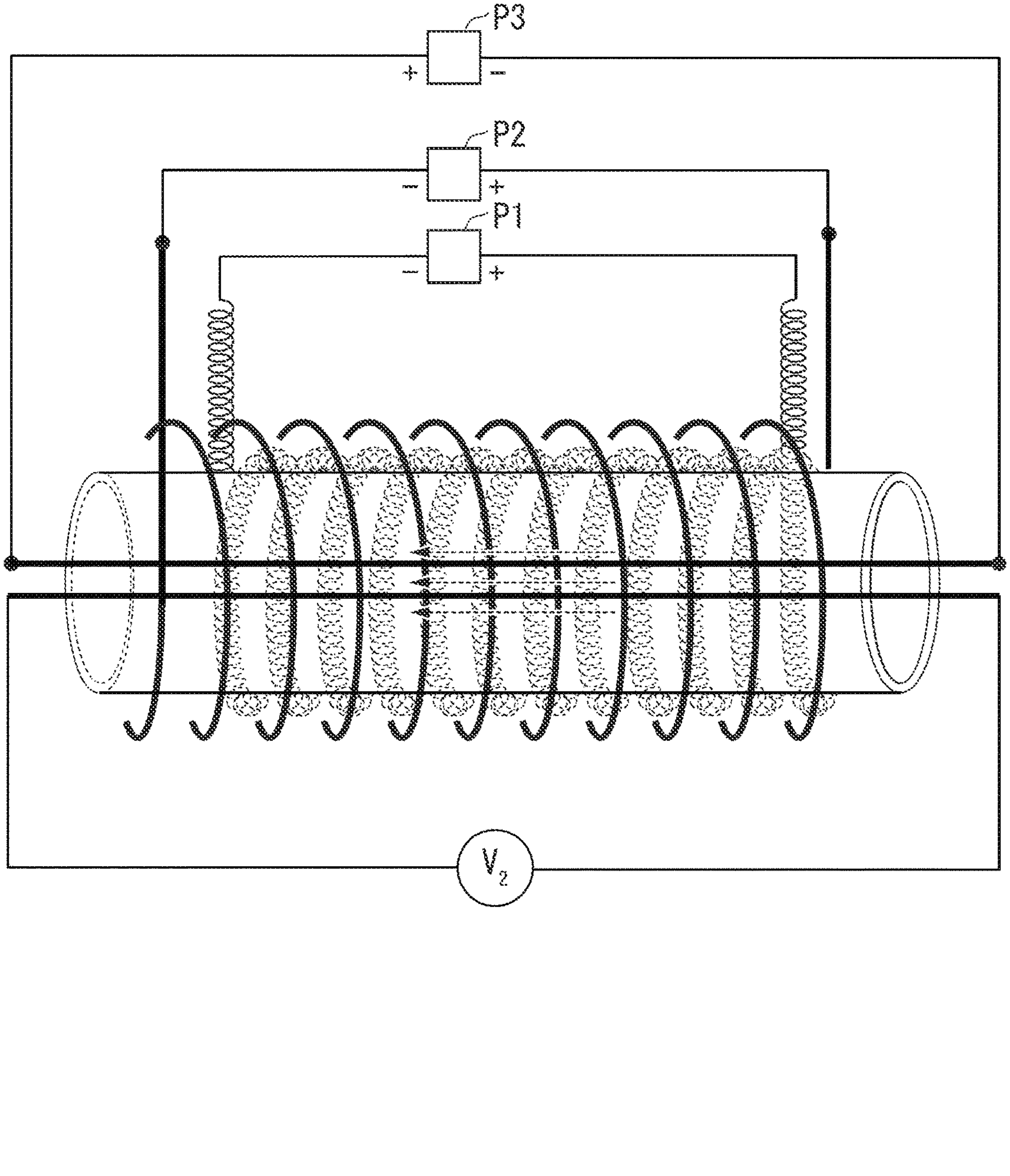
FIG. 26 is a drawing describing another embodiment of a method for driving a solenoid-type vector potential coil.

FIG. 26 shows another embodiment of a drive method for a solenoid-type vector potential coil of an aspect of the present invention. The solenoid-type vector potential coil has three power supplies (power supply P1, power supply P2, and power supply P3).

The power supply P1 drives the fine solenoid coil, which generates the main vector potential. The fine solenoid coil is left-winding with respect to the direction of its progression and it generates a vector potential (shown by the dotted line arrows) leftward in the base body. Simultaneously with that, because the direction of winding onto the cylinder of the base body is left-winding, from the right-hand screw rule, a rightward (opposite direction from the vector potential) magnetic field is generated within the base body. Additionally, because the overall current flows from the right side to the left side with respect to the axis of the base body, a leftward vector potential is generated within the base body. That is, a strong leftward vector potential, a weak leftward parasitic vector potential, and a rightward parasitic magnetic flux are generated.

The power supply P2 is connected to the solenoid coil that is right-winding with respect to the base body. This solenoid coil generates a leftward magnetic flux inside the base body, and if the coil shape and the current are adjusted, the above-described parasitic magnetic flux can be cancelled. Because the power supply P2 overall passes a leftward current with respect to the axis of the base body, a leftward vector potential is also generated. Because this vector potential is in the same direction as the parasitic vector potential generated by the above-described power supply P1, and added parasitic vector potential is generated.

The power supply P3 is connected to the straight conductor inside the base body and, because the power supply polarity is reversed, generates a rightward vector potential. Because the direction of this vector potential is opposite to the above-described parasitic vector potential, the parasitic vector potential can be cancelled by adjusting the current.

In this manner, even if independent power supplies, coils, and conductors are used, it is possible to cancel the parasitic magnetic field or parasitic vector potential generated by winding the fine solenoid coil onto the base body while twisting it.

The voltage $V_2$ is the secondary voltage, and it is possible to obtain a voltage that is in proportion to the time differential of a pure vector potential, from which the parasitic vector potential and the parasitic magnetic field have been removed.

For example, by providing a return circuit within the space of a fine solenoid coil, such as shown in FIG. 4, there is a need for not three, but only one power supply, and there is no need to have a conductor for cancelling the parasitic vector potential within the base body. Additionally, it is not necessary to make fine adjustment of the current of each power supply.

Although a vector potential generation device, a vector potential transformer, a shield permeation device, a non-contact space electric field generation device, and a null circuit of an aspect of the present invention have been described, the present invention is not restricted to these, and may be subject to appropriate modification, within the spirit of the present invention.

INDUSTRIAL APPLICABILITY

An aspect of the present invention can be widely applied to a vector potential generation device, a vector potential transformer, a shield permeation device, a non-contact space electric field generation device, a null circuit, and a structure for a vector potential generation device.

What is claimed is:

1. A vector potential generation device comprising:

a vector potential coil formed by a solenoid coil formed by a wound conductor, the vector potential coil being wound circularly around a base body, of which at least a part contacting the solenoid coil has an insulating property; and a power supply electrically connected between two terminals of the vector potential coil, wherein the vector potential generation device is configured to pass a current through the vector potential coil to place the inside of the internal space formed by the winding structure of the vector potential coil in substantially a non-magnetic field state and to generate a vector potential in the internal space.

2. The vector potential generation device according to claim 1, further comprising a return current conductor that is placed in series connection with the solenoid coil and that returns a current that is the same as the current flowing in the vector potential coil and in the opposite direction thereto.

3. The vector potential generation device according to claim 2, wherein the return current conductor is placed to pass through an internal space formed by the winding structure of the solenoid coil.

4. The vector potential generation device according to claim 2, wherein the return current conductor is placed coaxially with the winding structure of the solenoid coil and wound in a direction that is opposite to the winding direction of the solenoid coil with respect to the direction of progression of current.

5. The vector potential generation device according to claim 1, wherein the winding structure of the solenoid coil has a location made of a high-permeability material inside the winding structure.

6. The vector potential generation device according to claim 2, wherein the return current conductor is wound around the base body around which the solenoid coil is wound circularly, and the winding direction of the return current conductor is the same as the winding direction of the solenoid coil with respect to the direction of the progression of the current.

7. The vector potential generation device according to claim 1, wherein the base body is cylindrical.

8. The vector potential generation device according to claim 1, wherein the base body is donut-shaped.

9. The vector potential generation device according to claim 1, wherein the base body is disc shaped.

10. The vector potential generation device according to claim 1, wherein the base body is spherical or polyhedral.

11. A vector potential transformer comprising:

a vector potential generation device comprising:

a vector potential coil formed by a solenoid coil formed by a wound conductor, the vector potential coil being wound circularly around a base body, of which at least a part contacting the solenoid coil has an insulating property; and a power supply electrically connected between two terminals of the vector potential coil, the vector potential generation device being configured to pass a current through the vector potential coil to place the inside of the internal space formed by the winding structure of the vector potential coil in substantially a non-magnetic field state and to generate a vector potential in the internal space; and a secondary conductor is placed inside the base body, two ends of the second conductor being lead out from different end parts of the base body.

12. The vector potential transformer according to claim 11, wherein the base body is cylindrical.

13. The vector potential transformer according to claim 11, wherein the base body is disc shaped.

14. The vector potential transformer according to claim 11, wherein the base body is spherical or polyhedral.

15. The vector potential transformer according to claim 11, wherein the base body is donut-shaped, and the secondary conductor is placed in parallel in the toroidal direction inside the donut-shaped base body.

16. A non-contact space electric field generation device comprising:

a vector potential generation device comprising:

a vector potential coil formed by a solenoid coil formed by a wound conductor, the vector potential coil being wound circularly around a base body, of which at least a part contacting the solenoid coil has an insulating property; and a power supply electrically connected between two terminals of the vector potential coil, wherein the vector potential generation device is configured to pass a current through the vector potential coil to place the inside of the internal space formed by the winding structure of the vector potential coil in substantially a non-magnetic field state and to generate a vector potential in the internal space, and the vector potential generation device is configured to pass alternating current through the vector potential coil to generate an electric field proportional to the time differential of the alternating current and having a direction that is parallel to the axis of the vector potential coil.

17. The non-contact space electric field generation device according to claim 16, wherein the base body is cylindrical.

18. The non-contact space electric field generation device according to claim 16, wherein the base body is disc shaped.

19. The non-contact space electric field generation device according to claim 16, wherein the base body is spherical or polyhedral.

20. The non-contact space electric field generation device according to claim 16, wherein the base body is donut-shaped.

* * * * *